(12) United States Patent
Han et al.

(10) Patent No.: US 10,519,328 B2
(45) Date of Patent: *Dec. 31, 2019

(54) COMPOSITION AND METHOD FOR FORMING ELECTROACTIVE POLYMER SOLUTION OR COATING COMPRISING CONJUGATED HETEROAROMATIC POLYMER, ELECTROACTIVE POLYMER SOLUTION, OBJECTS COMPRISING THE ELECTROACTIVE COATING, AND SOLID ELECTROLYTIC CAPACITOR AND METHOD FOR FABRICATING THE SAME

(71) Applicant: PolyM technology corporation, Hsinchu (TW)

(72) Inventors: Chien-Chung Han, Hsinchu (TW); Ting-Chia Ku, Taichung (TW); Jo-Wen Chiang, Taichung (TW)

(73) Assignee: PolyM technology corporation, Hsinchu (TW)

( * ) Notice: Subject to any disclaimer, the term of this patent is extended or adjusted under 35 U.S.C. 154(b) by 170 days.

This patent is subject to a terminal disclaimer.

(21) Appl. No.: 15/456,595

(22) Filed: Mar. 13, 2017

(65) Prior Publication Data

US 2017/0183512 A1 Jun. 29, 2017

Related U.S. Application Data

(63) Continuation-in-part of application No. 14/306,251, filed on Jun. 17, 2014, now Pat. No. 9,627,147, which is a continuation-in-part of application No. 13/662,533, filed on Oct. 28, 2012, now Pat. No. 9,790,330.

(51) Int. Cl.
| | |
|---|---|
| C09D 5/24 | (2006.01) |
| C09D 125/06 | (2006.01) |
| H01G 9/00 | (2006.01) |
| H01G 9/15 | (2006.01) |
| H01G 9/025 | (2006.01) |

(52) U.S. Cl.
CPC ............. C09D 5/24 (2013.01); C09D 125/06 (2013.01); H01G 9/0036 (2013.01); H01G 9/025 (2013.01); H01G 9/15 (2013.01)

(58) Field of Classification Search
CPC ..... H01B 1/127; C08G 73/0611; C08G 75/00
See application file for complete search history.

(56) References Cited

U.S. PATENT DOCUMENTS

| | | | |
|---|---|---|---|
| 4,521,589 A | 6/1985 | Yamamoto et al. | |
| 4,697,001 A | 9/1987 | Walker et al. | |
| 4,803,596 A | 2/1989 | Hellwig et al. | |
| 4,910,645 A | 3/1990 | Jonas et al. | |
| 5,756,653 A | 5/1998 | Rieke | |
| 6,056,899 A | 5/2000 | Lessner et al. | |
| 6,166,172 A | 12/2000 | McCullough et al. | |
| 6,602,974 B1 | 8/2003 | McCullough et al. | |
| 6,891,016 B2 | 5/2005 | Reuter et al. | |
| 7,034,104 B2 | 4/2006 | Baik et al. | |
| 7,098,294 B2 | 8/2006 | McCullough et al. | |
| 7,452,958 B2 | 11/2008 | McCullough et al. | |
| 7,572,880 B2 | 8/2009 | Rieke | |
| 7,951,901 B2 | 5/2011 | Reuter et al. | |
| 9,627,147 B2 * | 4/2017 | Han .................... | C08G 61/126 |
| 2004/0085711 A1 | 5/2004 | Merker et al. | |
| 2004/0171790 A1 | 9/2004 | Baik et al. | |
| 2010/0004423 A1 | 1/2010 | Rieke | |
| 2010/0148124 A1 | 6/2010 | Reuter et al. | |
| 2010/0179301 A1 | 7/2010 | Henninger et al. | |
| 2010/0234478 A1 | 9/2010 | Rieke | |
| 2014/0121326 A1 | 5/2014 | Han et al. | |
| 2014/0293514 A1 | 10/2014 | Han et al. | |

OTHER PUBLICATIONS

Yoshino et al., "Preparation and Properties of Conducting Heterocyclic Polymer Films by Chemical Method," Japanese Journal of Applied Physics 23 (12), Dec. 1984, pp. L899-L900.

Meng et al., "Solid-State Synthesis of a Conducting Polythiophene via an Unprecedented Heterocyclic Coupling Reaction," Journal of the American Chemical Society 125 (49), Nov. 12, 2003, pp. 15151-15162.

Bonillo and Swager, "Chain-Growth Polymerization of 2-Chlorothiophenes Promoted by Lewis Acids," Journal of the American Chemical Society, Nov. 9, 2012, pp. 18916-18919.

Balasubramanian et al., "Chain-growth cationic polymerization of 2-halogenated thiophenes promoted by Brønsted acids," Polym. Chem, Jun. 16, 2014, pp. 5928-5941.

"Office Action of PCT Counterpart Application", dated Mar. 25, 2015, p. 1-p. 12.

Ken Shimizu Organic Chemistry FAQ: How to identify the most basic atom website (no date).

* cited by examiner

*Primary Examiner* — Mark S Kaucher
(74) *Attorney, Agent, or Firm* — JCIPRNET

(57) ABSTRACT

A composition for forming an electroactive coating includes an acid as a polymerization catalyst, at least one functional component, and at least one compound of formula (1) as a monomer:

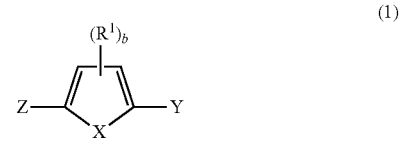

(1)

wherein X is selected from S, O, Se, Te, $PR^2$ and $NR^2$, Y is hydrogen (H) or a precursor of a good leaving group $Y^-$ whose conjugate acid (HY) has a $pK_a$ of less than 45, Z is hydrogen (H), silyl, or a good leaving group whose conjugate acid (HY) has a $pK_a$ of less than 45, b is 0, 1 or 2, each $R^1$ is a substituent, and the at least one compound of formula (1) includes at least one compound of formula (1) with Z=H and Y≠H.

17 Claims, 2 Drawing Sheets

COMPOSITION AND METHOD FOR FORMING ELECTROACTIVE POLYMER SOLUTION OR COATING COMPRISING CONJUGATED HETEROAROMATIC POLYMER, ELECTROACTIVE POLYMER SOLUTION, OBJECTS COMPRISING THE ELECTROACTIVE COATING, AND SOLID ELECTROLYTIC CAPACITOR AND METHOD FOR FABRICATING THE SAME

CROSS-REFERENCE TO RELATED APPLICATION

This application is a continuation-in-part application of and claims the priority benefit of a prior application Ser. No. 14/306,251, filed on Jun. 17, 2014, now allowed. The prior application Ser. No. 14/306,251 is a continuation-in-part application of and claims the priority benefit of a prior application Ser. No. 13/662,533, filed on Oct. 28, 2012, now pending. The entirety of each of the above patent applications is hereby incorporated by reference herein and made a part of this specification.

BACKGROUND OF THE INVENTION

Field of Invention

This invention relates to conducting polymers, their preparation and their applications, and more particularly relates to a method for forming a conjugated heteroaromatic polymer, to a conjugated heteroaromatic homopolymer or copolymer formed by the method, to a composition for forming an electroactive polymer solution or coating comprising a conjugated heteroaromatic polymer, to an electroactive polymer solution prepared from the composition, to an electroactive coating prepared from the composition, to a capacitor, an electroactive object, an electronic device, a flexible electronic article, a display, an electrochromic window, a touch panel, a touch screen, a corrosion-preventing coating or a conductive ink printing comprising the electroactive coating prepared from the composition, to a method for forming an electroactive polymer solution or coating using the composition, to a capacitor, an electroactive object, an electronic device, a flexible electronic article, a display, an electrochromic window, a touch panel, a touch screen, a corrosion-preventing coating or a conductive ink printing comprising the electroactive coating prepared from the coating forming method, to a method for fabricating a solid electrolytic capacitor using the coating forming method, and to a solid electrolytic capacitor that is fabricated using the fabrication method.

Description of Related Art

During the past few decades, backbone-conjugated conducting polymers, such as polyacetylenes, polyanilines, polyaromatics, polyheteroaromatics, poly(aromatic vinylene)s and poly(heteroaromatic vinylene)s, have raised great research interests in both industrial and academic communities, because of their great application potentials and their novel electronic, optical, electrooptical, and opto-electronic properties. Conducting polymers have been demonstrated to have great potentials for many important applications, such as antistatic, ESD, EMI-shielding, cable-shielding, radar-shielding, high frequency capacitor, rechargeable battery, anti-corrosion, gas separation membranes, smart window, chemical sensor, bio-sensor, solar cell, light-emitting diode, electrochromic display, field effect transistor, organic memory device, lithography, via-hole electroplating, and nonlinear optical materials.

Among the conjugated conducting polymers, polyheteroaromatics and particularly polythiophenes have attracted great attentions recently due to their easier processability and better thermal stability. Regarding the conventional methods, most of the polyheteroaromatics have been synthesized from heteroaromatics via oxidative polymerization either electrochemically or chemically. For example, U.S. Pat. No. 4,697,001 discloses synthesis of polypyrrole from pyrrole via oxidative chemical polymerization using metal-containing oxidant, such as $FeCl_3$ or $Fe(OTs)_3$.

Polythiophenes have been in general prepared either from 2,5-unsubstituted thiophenes or from 2,5-dihalogenated thiophenes. For example, polythiophene can be prepared from thiophene using metal-containing oxidants such as $FeCl_3$, $MoCl_5$, and $RuCl_3$ (*Jpn. J. Appl. Phys.* 1984, 23, L899), or from 2,5-dibromothiophene via metal-catalyzed polycondensation polymerization using the combined reagent of Mg metal and Ni(0) catalyst (U.S. Pat. No. 4,521,589). Recently, the metal-catalyzed polycondensation method has been modified by many research groups, such as Reike's and McCullough's, for making regioregular poly(3-substituted thiophenes) from 3-substituted 2,5-dibromo-thiophenes using various combination of metal-containing reagents: such as Li/naphthalene/$ZnCl_2$/Ni(II) or Pd(0) complex (U.S. Pat. No. 5,756,653), organomagnesium reagent/Ni(II)-complex (U.S. Pat. No. 6,166,172), organomagnesium reagent/$ZnCl_2$/Ni(II)-complex (U.S. Pat. No. 7,572,880), and organomagnesium reagent/$MnCl_2$/Ni(II) complex (US 2010/0234478A1).

Up to now, there is only one reported prior method of preparing polythiophene from 2-bromothiophenes (U.S. Pat. No. 6,602,974). For example, McCullough indicated that the above regioregular poly(3-substituted thiophenes) can also be made from 3-substituted 2-bromo-thiophene via a three-step reaction by treating the monomer in the first step with a strong base LDA (lithium diisopropylamine, prepared freshly from the reaction of diisopropylamine with n-butyl lithium) under cryogenic temperatures at −40° C. for 40 minutes, followed by the addition of $MgBr_2$ at −60° C. for about 1 hour in the second step, and then by the addition of Ni(II)-complex at −5° C. in the third step, and finally allowed the reaction to proceed at room temperature for additional 18 hours.

All the above mentioned prior methods have encountered the disadvantage of being contaminated with substantial amount of transitional metal impurities that can cause detrimental effects to the optimal performance, long term stability, and the lifetime of their application articles and devices. Furthermore, most of the conventional methods involve use of either a strong base (such as organolithium reagent, organomagnesium reagent, and LDA) or a reactive metal (such as activated Zn metal, Mg metal, and Li metal), or in some cases the use of both reagents. These reagents are reactive toward the monomers that contain a proton group having a $pK_a$ value of less than about 40 (such as S—H, O—H, N—H, acetylenic proton, α-hydrogen to a carbonyl group or to other electron-withdrawing group, and all the C—H groups except those of alkyl, alkoxy, phenyl, and vinyl) and also reactive toward electrophilic functional groups (such as carbonyl, carbonate, nitrile, imino, nitro, nitroso, sulfoxide, sulfinyl, and sulfonyl, phosphonyl, phosphinyl, epoxy, alkyl halide, and other similar groups).

Such reactivity will cause great limitations on the allowable functional groups appearing on the thiophene monomers. Similar limitations would also occur to the conventional chemical oxidative polymerization method, wherein the employed strong oxidant causes the undesirable oxidation side reactions to some of the functional groups. The high reactivity of both the above strong base and active metal will also greatly limit the applicable reaction and/or processing solvent media. These strong bases and reactive metals are also in general moisture- and air-sensitive, which requires the use of expensive and complicated production apparatus, facility, handling and manufacturing process. These reactive reagents also cast great industrial potential hazards. In addition, the above methods often involve the use of either the cryogenic temperatures (such as −40° C. to −78° C.) or the reflux temperatures for long hours, which would further increase the production costs and energy consumptions. Further, these transition metal complexes are not only very expensive but also environmentally concerned.

Though a specific polythiophene derivative, poly(3,4-ethylenedioxythiophene) (PEDOT), has been prepared via a catalyst-free solid-state oxidative polymerization by heating the solid crystals of 2,5-dibromo-3,4-ethylenedioxythiophene (DBEDOT) as a monomer at some elevated temperatures below its melting temperature (96-97° C.), as described in *J. Am. Chem. Soc.* 2003, 125, 15151-15162, the same polymerization did not proceed in its melt or solution state. Such solid-state polymerization method is also only applicable to limited cases due to its unique requirements for the steric arrangement between two neighboring dihalogenated monomers within the crystal. In the same report, they had also found that the addition of protonic acid catalyst (such as HBr) did not lead to any changes to the dibromo-monomer (see the footnote 24 thereof).

On the other hand, U.S. Pat. No. 6,891,016 discloses that in presence of protonic acid or Lewis acid, non-brominated 3,4-ethylenedioxythiophene (EDOT) changes significantly to yield an equilibrium reaction mixture that contains unreacted monomer (~50%) and non-conjugated dimeric and trimeric thiophenes (~50%), instead of polymers. Though U.S. Pat. No. 7,951,901 discloses that the mixture of EDOT and DBEDOT can somehow undergo polymerization in presence of protonic acid or Lewis acid, the polymerization requires heating at high temperatures (80-90° C.) for long time (5-11 h) and only gives PEDOT in a poor yield (40-60%) with a rather low conductivity of $10^{-2}$-$10^{-7}$ S/cm. Furthermore, this method is only applicable to 3,4-dialkoxy-substituted thiophenes.

Thus, there is a great need for an effective, energy saving, and environmentally friendly method for making polythiophenes and polyheteroaromatics in general.

While, regarding the applications of conductive polymer, U.S. Pat. No. 4,803,596 discloses that a conductive polymer may be used as the solid electrolyte of a solid electrolytic capacitor. In the method, the positive foil of an electrolytic capacitor is dripped with a monomer solution and an oxidant solution sequentially, and the monomer is polymerized by the oxidant under proper condition. However, because the conductive polymer monomer is not fully and homogeneously mixed with the oxidant, the reaction and the resultant coating are not uniform.

U.S. Pat. No. 4,910,645 discloses that a series of specific polythiophenes can apply to the electrolyte of solid state electrolytic capacitors. The method includes dipping a capacitor element in a pre-mixed solution of a thiophene monomer and an oxidant and then polymerizing the thiophene monomer at higher temperature. However, the stability of the mixture at room temperature decreases significantly if high concentration of the monomer and/or the oxidant is used. Therefore, the method uses a large amount of solvent to dilute the concentration of the monomer and the oxidant, so only a very little amount of conductive polymer coating forms in every single impregnation-polymerization cycle. Hence, many cycles are required to generate enough amounts of conductive polymer for filling the pores and spaces in the capacitor element.

U.S. Pat. No. 6,056,899 discloses a process that uses a kind of cyclic ether (such as THF) to mix with an Fe(III) oxidant for forming a coordination complex to reduce the oxidation ability of the oxidant so that the mixture solution of the monomer and the oxidant is kept stable. After the capacitor element is impregnated with the mixture, the cyclic ether is evaporated at a higher temperature to release the oxidant for inducing polymerization of the monomer. Since the cyclic ether used in the invention (such as THF) has little ability as a polymerization retardant to stabilize the mixture solution of the monomer and the oxidant, a large amount of such cyclic ether (ca. 40-60 wt %) is employed in order to stabilize the mixture solution, and consequently dilutes the mixture solution. As a result, many impregnation-polymerization cycles (e.g., 12 cycles) are still required to accumulate enough amounts of conductive polymer for filling the pores and spaces in the capacitor element.

The current solid capacitors still suffer many technological drawbacks, such as having rather low pore-filling rate, thus, resulted in a low static capacitance (which are in general in the 50-60% range of the theoretical static capacitance) and rather weak mechanical strength (due to the presence of high percentages of the unfilled or partly filled pores within the fragile dielectric layer). Owing to the inefficient pore-filling nature, the solid capacitors require the use of much longer anodic foil to deliver the same given value of static capacitance. Hence, the length of the counter cathode foil and the two separators also have to be much increased accordingly, leading to much increased overall volume and size of the capacitors. The fact that the dielectric layer has a high percentage of the unfilled or partly filled pores also make the conventional solid capacitors very susceptible to the vibrational stress and mechanical impact during their applications, leading to higher failure rate and shorter service lifetime. The conventional solid capacitors also suffer the disadvantages of having poor thermal stability and with rather low withstanding voltages, probably caused by the presence of the large amounts of the transition metal contaminants due to the use of large quantity of Fe(III) tosylate (in theory, 2.5 equivalent is required to use) as the oxidant for performing the oxidative polymerization of the EDOT (i.e., 3,4-ethylenedioxythiophene) monomer. All these disadvantages have greatly limited the performance, service lifetime, and the application potentials of the conventional solid capacitors.

SUMMARY OF THE INVENTION

Accordingly, this invention provides an effective, low-cost, environmentally friendly method for forming a conjugated heteroaromatic polymer or copolymer.

This invention also provides a conjugated heteroaromatic polymer or copolymer that can be formed by using the method of this invention.

This invention further provides a composition for forming an electroactive polymer solution or coating.

This invention further provides a method for forming an electroactive polymer solution or coating comprising a conjugated heteroaromatic polymer.

This invention further provides an electroactive coating that is prepared from the composition of this invention or by the coating forming method of this invention.

This invention further provides an electroactive polymer solution that is prepared from the composition of this invention or by the polymer solution forming method of this invention.

This invention further provides an application article containing the electroactive coating of this invention, which comprises a conjugated heteroaromatic polymer that is free of transitional metal contaminants or residues. The application article may be a solid electrolytic capacitor, a supercapacitor, one of various electroactive objects (such as antistatic, electrostatic dissipation, EMI shielding, infrared, radio frequency and microwave absorbing shields, and smart cards), a flexible or nonflexible electronic article, a display, a touch panel, a touch screen, an electrochromic window, a corrosion-prevention coating, or a conductive ink printing, etc.

This invention further provides a method for fabricating a solid electrolytic capacitor, which uses the coating forming method of this invention.

This invention further provides a solid electrolytic capacitor that is fabricated using the fabrication method of this invention.

This invention also provides a high performance solid capacitor, having high static capacitance, low ESR, low DF, low LC, high thermal stability, high mechanical strength, small volume, and long service lifetime.

This invention also provides a high performance solid capacitor that are particularly suitable for the applications in automobile electrical and electronic equipment, audio-video appliance, computer servers, LED lighting system, LED bulb, power supply, power generator, the inverters and/or converters for solar cells and photovoltaic cells.

This invention also provides a general purpose composition and polymerization method for making both low voltage and high voltage solid capacitors.

This invention is based on the discovery of the unusual high polymerization reactivity of a heteroaromatic compound bearing with only one leaving group at position 2 or 5 of the herteroaromatic ring, which can be initiated by an acid catalyst to give a highly conjugated and conductive polyheteroaromatic, having a predominant 2,5-linkage backbone structure.

In a method for forming a conjugated heteroaromatic polymer of this invention, at least one compound of formula (1) is polymerized using an acid as a catalyst,

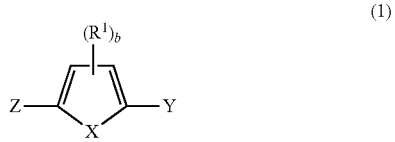

(1)

wherein X is selected from the group consisting of S, O, Se, Te, $PR^2$ and $NR^2$, wherein $R^2$ is selected from the group consisting of hydrogen, and substituted or unsubstituted alkyl, aryl, heteroaryl, alkanoyl, and aryloyl groups. Y is hydrogen (H), or a precursor of a good leaving group $Y^-$ whose conjugate acid (HY) has a $pK_a$ of less than 45. Z is hydrogen (H), silyl, or a precursor of good leaving group $Z^-$ whose conjugate acid (HZ) has a $pK_a$ of less than 45. The value b is 0, 1 or 2. Each R is a substituent. When b=2, the two $R^1$ are the same or different and may joint together to form a substituted or unsubstituted aliphatic, aromatic, or heteroaromatic ring, which may include one or more heteroatoms and/or divalent moieties selected from nitrogen, sulfur, sulfinyl, sulfonyl, phosphorus, selenium, ester, carbonyl, oxygen, and so on. The at least one compound of formula (1) being polymerized comprises at least one compound of formula (1) with Z=H and Y≠H.

The inventors also found that an oligomer or polymer formed by polymerizing a compound of formula (1) with Z=H and Y≠H as above also has polymerization reactivity. Accordingly, a derivative method for forming a conjugated heteroaromatic polymer of this invention is provided, wherein at least one compound of formula (2) is polymerized using an acid as a catalyst,

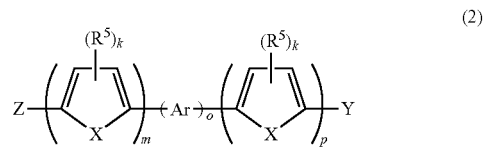

(2)

wherein X, Y and Z are defined as above. Ar is a substituted or unsubstituted, mono- or poly-nuclear, aryl or heteroaryl ring. The values m, o and p are each independently an integer equal to or greater than 0, with a proviso that m+p≥1. Each k is independently 0, 1 or 2. Each $R^5$ is a substituent, wherein any two $R^5$ on the same ring or on two neighboring rings, or $R^5$ and a substituent group on a neighboring Ar ring, may join together to form a substituted or unsubstituted aliphatic, aromatic, or heteroaromatic ring, which may include one or more heteroatoms and/or divalent moieties selected from nitrogen, sulfur, sulfinyl, sulfonyl, phosphorus, selenium, ester, carbonyl, oxygen, and so on. The at least one compound of formula (2) being polymerized comprises at least one compound of formula (2) with Z=H and Y≠H.

In another embodiment of this invention, a compound of formula (2) can also be used as the polymerization promoter for a compound of formula (1). For example, a less reactive compound of formula (1) with Z≠H and Y≠H or with Z=H and Y=H can be first mixed with a small and predetermined amount of a compound of formula (2), following by the addition of the acid catalyst. Owing to the greater conjugation extent and thus the greater electronic density of the compound of formula (2), the acid catalyst will first react with the compound of formula (2) that will then promote the coupling reaction between the compound of formula (2) and the compound of formula (1), thus initiating the polymerization of the compound of formula (1). Moreover, the inventors also found that a less reactive compound of formula (1) selected from the group consisting of compounds of formula (1) with Z≠H and Y≠H and compounds of formula (1) with Z=H and Y=H can also react with an oligomer or polymer that is formed by polymerizing a compound of formula (1) with Z=H and Y≠H to further elongate the polymer chain. Accordingly, it is possible to polymerize a first compound of formula (1) with Z=H and Y≠H first to form a polymer chain, followed by the addition of a second compound of formula (1) with Z=H and Y≠H, Z≠H and Y≠H, or Z=H and Y=H, but with a different combination set of X, $R^1$ and b to further elongate the polymer chain forming a different block and thus to yield a diblock copolymer. Then, the first compound or a third compound of formula (1) with Z=H and Y≠H, Z≠H and Y≠H, or Z=H and Y=H, but having a still different combination set of X, $R^1$ and b can be added to form a further block. Thus, a triblock copolymer with either an A-B-A or an A-B-C structural configuration can be prepared, wherein A, B, C are representing different polymer blocks. Likewise, a multi-block copolymer can be similarly prepared by simply controlling the addition sequence and reaction timing for each different monomeric compound of formula (1).

Accordingly, an embodiment of this invention is a conjugated heteroaromatic block copolymer including a fragment expressed by formula (3):

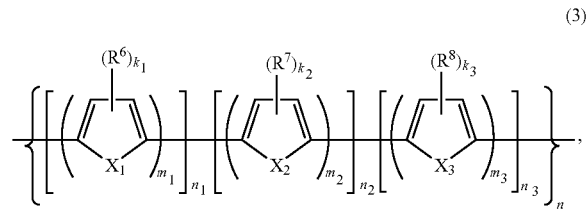

wherein n is an integer equal to or greater than 1, $m_1$, $m_2$ and $m_3$ are independently integral equal to or greater than 2, and $n_1$, $n_2$ and $n_3$ are independently 1 or 0. $X_1$, $X_2$ and $X_3$ are the same or different, and are independently selected from the group consisting of S, O, Se, Te, $PR^2$ and $NR^2$, wherein $R^2$ is selected from the group consisting of hydrogen, and substituted and unsubstituted alkyl, aryl, heteroaryl, alkanoyl, and aryloy groups. The values $k_1$, $k_2$, $k_3$ are independently 0, 1 or 2. $R^6$, $R^7$ and $R^8$ are the same or different substituents and can be selected from permissible $R^5$ groups, wherein any two $R^6$ or two $R^7$ or two $R^8$ groups on the same ring may join together to form another ring. In formula (3), there is a proviso that any two neighboring blocks have different repeat units.

Furthermore, the above derivative method comprising polymerizing at least one compound of formula (2) produces a conjugated heteroaromatic copolymer that comprises a fragment expressed by formula (4):

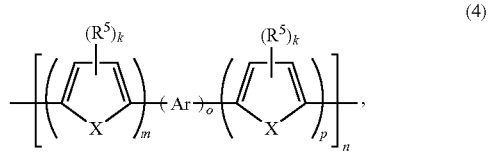

wherein n is an integer equal to or greater than 4, X is the same or different at each occurrence and is defined as above, and Ar, k, $R^5$, m, o and p are defined as above.

In some embodiments, the conjugated heteroaromatics copolymers expressed by formula (4) are alternative copolymers having two or more different types of repeat units alternatively appeared along the polymer chain.

The conducting polymer solutions or coatings of this invention can be provided by any suitable method known in the art, from the preformed conjugated polymer product or from the composition of this invention.

The composition for forming a conjugated heteroaromatic polymer solution or coating of this invention comprises the aforementioned at least one compound of formula (1) as a monomer that comprises at least one compound of formula (1) with Z=H and Y≠H or the aforementioned at least one compound of formula (2) as a monomer that comprises at least one compound of formula (2) with Z=H and Y≠H, an acid as a polymerization catalyst selected from the group consisting of a protic acid, a polymeric acid and a non-transitional Lewis acid (i.e., a Lewis acid that is free of transition metal elements), and at least one functional component selected from the group of a solvent, a polymerization retardant, a polymer binder, a dopant, a latent dopant, a dielectric layer protection agent, a dielectric layer repair agent, a plasticizer, an impact modifier, a reinforcing filler, a blowing agent, a crosslinking agent, an ultraviolet stabilizer, a flame retardant, a photoresist, a thickening agent, a defoaming agent, an emulsifier, a surfactant, and a dispersion stabilizer.

In some embodiments, the at least one functional component contains at least a polymerization retardant comprising at least one Lewis base having a stronger basicity than the monomer. In other preferred embodiments, the at least one functional component contains at least a polymerization retardant and a polymer binder.

The method for forming an electroactive polymer solution of this invention includes: placing the above composition in a reactor, and conducting at least one of a step of raising the temperature of the composition, a step of evaporating partly the solvent in the composition, and a step of evaporating partly or completely the polymerization retardant used as the functional component in the composition, so as to initiate and/or continue polymerization to form an electroactive polymer solution comprising a conjugated heteroaromatic polymer.

The method for forming an electroactive coating of this invention includes: contacting the above composition with a substrate, and conducting at least one of a step of raising the temperature of the substrate, a step of evaporating partly the solvent in the composition, and a step of evaporating partly or completely the polymerization retardant used as the functional component in the composition, so as to initiate and/or continue polymerization on a surface of the substrate and/or in a pore of the substrate and form a conjugated heteroaromatic polymer.

Alternatively, the method for forming an electroactive coating of this invention includes using the electroactive polymer solution, which is prepared from the above preparation method or from the composition of this invention, to form a coating via any suitable method known in the art, such as solution casting, melt casting, dipping, dripping on, squirting, spraying, doctor blade coating, painting, and printing.

The method for fabricating a solid electrolytic capacitor of this invention includes the following steps at least. An anode is formed. A dielectric layer is formed on the anode. An electroactive coating is formed on the dielectric layer to serve as a solid electrolyte. The solid electrolyte may be considered as a true cathode. The electroactive coating can be provided by all suitable methods know in the art, such as by solution casting or melt casting on a substrate or an object based on a preformed conjugated heteroaromatics polymer made by the polymerization method of this invention, or by solution casting, dipping, dripping on, squirting, spraying, doctor blade coating, painting, or printing on a substrate or an object with a polymerization solution preformed from the composition of this invention. In one preferred embodiment, the electroactive coating is formed from the composition via in-situ polymerization, with the electroactive coating forming method mentioned above.

Because no air- and moisture-sensitive reagents are needed in the method for forming a conjugated heteroaromatic polymer of this invention, the method is friendly in chemical handling. Moreover, since the method needs a simple production facility and the manufacturing process is simple and safe, the manufacturing cost is low. In addition, since the polymerization can be effectively conducted at ambient temperature, the method is also energy-saving.

Also, the manufacturing process of the method of this invention is heavy-metal free, so that the method is environmentally friendly. The polymer product is transition-metal-free or may even be metal ion free, so that the application shelf life thereof is longer.

In addition, since the electroactive coating of this invention is prepared from a composition containing at least one acid catalyst selected from the group consisting of a protic acid, a non-transitional Lewis acid, and a polymeric acid, and is therefore also substantially free of transitional metal contaminants. The amount of the transition metal contaminants in the resultant electroactive coating is expected to be low and would be at least lower than 1 wt %, and preferably lower than 0.1 wt %, and more preferably lower than 0.01 wt %, and most preferably lower than 0.001 wt %. The application products built based on these transitional-metal-free electroactive coating should also have long application shelf life.

The yield of the polymerization reaction is also high because of the high reactivity of the heteroaromatic ring having only one leaving group at its position 2 or 5. Moreover, since the coupling reaction between two rings has a higher directional preference, a fairly regioregular conductive polymer, with predominantly 2,5-linkage backbone structure, can be obtained.

Furthermore, the method of this invention is convenient in making block copolymers, which are, for example, potential good materials with broad range of UV-vis-NIR absorption for solar cell application. The method of this invention can also be used to produce an extremely high molecular weight polymer that may be used as an extra high mechanical strength material, due to the reactivity of the oligomer or polymer formed by the method with additional monomers fed thereto.

The method of this invention also has high tolerability to functional groups, such as acid, carbonyl, nitrile, —OH, or any acidic proton of $pK_a$<40. In addition, the polymer product of the method can also have other advantageous properties, such as high solubility (>1-10 wt %) in many common organic solvents (such as $CHCl_3$, $CH_2Cl_2$, TCE, THF, NMP, DMF, $CS_2$, xylene, toluene, chlorobenzene, and o-dichlorobenzene), good film forming properties, strong film adhesion with various substrates such as plastic, glass, metal, and metal oxide, high conductivity (~180 S/cm), and ability for self-assembling. Furthermore, the electronic or electrooptical application devices (such as LEDs and capacitors) fabricated with the transitional-metal-free polymer product of this invention may have longer service lifetime and/or much enhanced performance properties (such as raising up the breakdown voltage and/or thermal stability to render a capacitor device more suitable for high working voltage and/or high working temperature applications).

Moreover, by including an effective polymerization retardant in the functional additive, such as a Lewis base having a stronger basicity than the monomer, the stability of the composition for forming an electroactive coating of this invention can be greatly enhanced, which allows the use of a composition having a much higher monomer concentration (as high as a neat monomer liquid, as described in Example 44 in the prior application Ser. No. 14/306,251, filed on Jun. 17, 2014, now allowed) so that a conductive polymer coating having a sufficient thickness may be formed in a single impregnation-polymerization cycle. Furthermore, by concurrently including a polymerization retardant and a polymer binder as the functional components in the composition of this invention, it would render the solid capacitor of this invention with a super high quality having a higher static capacity, a lower ESR, a lower DF, a higher mechanical strength, higher interfacial adhesions between the electroactive coating and all the component layers of the capacitor element, a higher thermal stability, and a longer service lifetime. Since these high quality solid capacitors can survive under tough working environments, such as high vibrational stresses and mechanical impacts, high working temperatures, and/or high working voltages, they are particularly suitable for the applications of automobile electrical and electronic equipment, audio-video apparatuses, LED lamps and LED lighting systems, high voltage and high capacity power generators and power supply. The much improved mechanical strength and thermal stability of the electroactive coating also render them particularly suitable for various flexible or nonflexible electronic articles, displays, electrochromic window devices, or photovoltaic devices, solar cells, and other outdoor static and/or dynamic electroactive application objects. In addition, the composition and/or electroactive solution of this invention are also particularly suitable for corrosion-prevention coating and conductive ink printing applications.

In order to make the aforementioned and other objects, features and advantages of this invention comprehensible, a preferred embodiment accompanied with figures is described in detail below.

DESCRIPTION OF EMBODIMENTS

Figure 1:
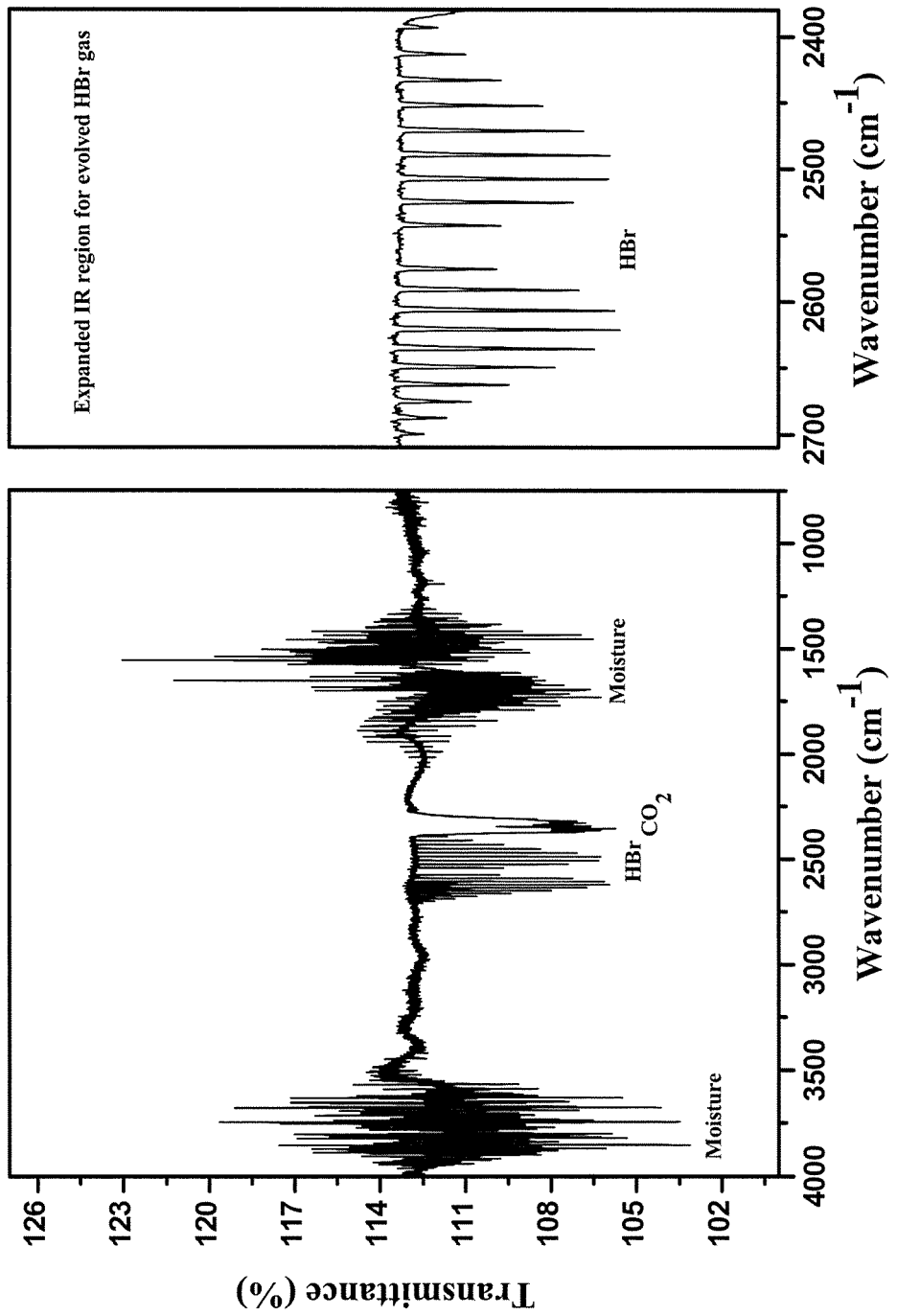
FIG. 1 is the IR spectrum of the HBr gas generated from the polymerization reaction.

It is first noted that the term "a compound of formula (1)" is sometimes called "a compound (1)" hereafter for simplicity. The same rule applies to formula (2).

The group X, $X_1$, $X_2$ or $X_3$ in the heteroaromatic ring of the above formulae (1)-(4) is selected from the group consisting of S, O, Se, Te, $PR^2$ and $NR^2$, wherein $R^2$ is selected from the group consisting of hydrogen, and substituted or unsubstituted alkyl, aryl, heteroaryl, alkanoyl, and aryloyl groups.

The group Y in the above formulae (1)-(2) is hydrogen (H), or a precursor of a good leaving group $Y^-$ whose conjugate acid (HY) has a $pK_a$ of less than 45, preferably less than about 30, more preferably less than about 20, most preferably less than about 6. Useful leaving groups Y include halogen-based, O-based, N-based, S-based, P-based and weakly basic C-based substituent groups. The preferred leaving group Y is selected from the group consisting of iodide, bromide, chloride, fluoride, sulfonates, sulfinates, phosphates, phosphinates, phosphonates, carboxylates, cyano, nitro, nitrite, carbonates, amido, imido, amide, imide, amino, alkylamino, arylamino, heteroarylamino, amine, alkylamine, arylamine, heteroarylamine, acetylacetone, alkoxy, and aryloxy. The more preferred leaving group Y is selected from the group consisting of iodide, bromide, chloride, fluoride, sulfonates, phosphates, phosphinates, phosphonates, carboxylates, carbonates, amide, imide, amino, amine, alkylamine, arylamine, heteroarylamine, acetylacetone, alkoxy, and aryloxy.

The group Z in the above formulae (1) and (2) is hydrogen (H), silyl, or a precursor of good leaving group $Z^-$ whose conjugate acid (HZ) has a $pK_a$ of less than 45, preferably less than about 30, more preferably less than about 20, most preferably less than about 6. Useful leaving groups Z include halogen-based, O-based, N-based, S-based, P-based, Si-based and weakly basic C-based substituent groups. The preferred Z group is selected from the group consisting of hydrogen, silyl, iodide, bromide, chloride, fluoride, sulfonates, sulfinates, phosphates, phosphinates, phosphonates, carboxylates, cyano, nitro, nitrite, carbonates, amido, imido, amide, imide, amino, alkylamino, arylamino, heteroarylamino, amine, alkylamine, arylamine, heteroarylamine, acetylacetone, alkoxy, and aryloxy. The more preferred Z group is selected from the group consisting of hydrogen, silyl, iodide, bromide, chloride, fluoride, sulfonates, phosphates, phosphinates, phosphonates, carboxylates, carbonates, amide, imide, amino, amine, alkylamine, arylamine, heteroarylamine, acetylacetone, alkoxy, and aryloxy.

It is essential in the method of this invention that the at least one compound of formula (1) or (2) being polymerized includes at least a compound of formula (1) or (2) with Z=H and Y≠H, which acts to trigger the polymerization reaction. A compound of formula (1) or (2) with Z=H and Y=H and/or a compound of formula (1) or (2) with Z≠H and Y≠H, which cannot be polymerized alone with the acid catalyst, can however be polymerized in the presence of the compound of formula (1) or (2) with Z=H and Y≠H due to the triggering effect.

<Substituents R on the Heteroaromatic Ring>

Each $R^1$ in formula (1), each $R^5$ in formula (2), each of $R^6$, $R^7$ and $R^8$ in formula (3), or each $R^5$ in formula (4), is independently selected from the group consisting of deuterium, alkyl, alkenyl, alkynyl, alkenynyl, aryl, alkylaryl, arylalkyl, allyl, benzyl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, mercaptoalkoxy, mercaptoaryloxy, mercaptoalkyl, mercaptoaryl, mercaptoarylthio, mercaptoalkylthio, mercaptoalkylarylalkyl, mercaptoarylalkylaryl, halo, hydroxyl, hydroxyalkyl, hydroxyaryl, cyano, nitro, alkylsilyl, arylalkyl, alkoxysilyl, aryloxysilyl, mercapto, epoxy moieties, amino, aminoalkyl, aminoaryl, amido, amidoalkyl, amidoaryl, arylamino, diarylamino, alkylamino, dialkylamino, alkylarylamino, alkoxyalkyl, aryloxyalkyl, alkoxycarbonyl, alkoxysilylalkyl, alkylsilylalkyl, alkoxysilylaryl, alkylsilylaryl, heterocyclic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate, alkylphosphate, arylcarboxylate, arylsulfinate, arylsulfonate, arylphosphonate, arylphosphate; derivatives of various acid functional groups including phosphonic acid, phosphinic acid, phosphoric acid, boric acid, carboxylic acid, sulfinic acid, sulfonic acid, sulfamic acid, and amino acid, wherein the acid derivatives may include ester, amide and metal salt; aliphatic moieties having a repeating unit of —$(OCH_2CH_2)_qOCH_3$, —$(OCH_2CH(CH_3))_qOCH_3$, —$(CH_2)_qCF_3$, —$(CF_2)_qCF_3$ or —$(CH_2)_qCH_3$, wherein q≥1; and a moiety of $(OR^3)_rOR^4$, wherein $R^3$ is a divalent $C_{1-7}$ alkylene moiety, $R^4$ is $C_{1-20}$ alkyl, 1≤r≤50. All the above mentioned substituent groups may be further substituted with allowable functional groups, such as ester, amino acid, halo, epoxy, amino, silyl, nitro, alkyl, aryl, alkoxy, aryloxy, alkylthio, and arylthio groups.

Any two $R^1$ groups in formula (1), or any two $R^5$ groups on the same ring or on the neighboring rings in formula (2) and (4), or any $R^5$ together with the substituent group on the neighboring Ar ring in formula (2) and (4), or any two $R^6$ or any two $R^7$ or any two $R^8$ groups on the same ring or on neighboring rings in formula (3) may joint together to form a substituted or unsubstituted alkylene, alkenylene, or alkynylene chain completing an aromatic, heteroaromatic, heteroalicyclic or alicyclic ring system, which may include one or more heteroatoms and/or divalent moieties such as nitrogen, sulfur, sulfinyl, sulfonyl, phosphorus, selenium, ester, carbonyl, and oxygen, wherein permissible substituents are the aforementioned functional groups.

<Aromatic Group Ar in Formula (2)/(4)>

The aromatic group Ar in formula (2)/(4) is substituted or unsubstituted, mono- or poly-nuclear, aryl or heteroaryl. The aryl and heteroaryl preferably denote a mono-, bi- or tri-cyclic aromatic or heteroaromatic group with up to 25 C atoms that may also comprise condensed rings and is optionally substituted. Preferred aryl groups include, without limitation, benzene, biphenylene, triphenylene, naphthalene, anthracene, binaphthylene, phenanthrene, pyrene, dihydropyrene, chrysene, perylene, tetracene, pentacene, benzpyrene, fluorene, indene, indenofluorene, spirobifluorene, and the like. Preferred heteroaryl groups include, without limitation, 5-membered rings like pyrrole, pyrazole, imidazole, 1,2,3-triazole, 2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings like pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, and fused systems like carbazole, indole, isoindole, indolizine, indazole, benzimidazole, benzotriazole, purine, naphthimidazole, phenanthrimidazole, pyridimidazole, pyrazimmidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, dithienopyridine, isobenzothiophene, dibenzothiophene, benzothiadiazothiophene, or combinations thereof. The heteroaryl groups may be substituted with allowable functional groups, such as acid, ester, amino acid, halo, epoxy, amino, silyl, nitro, alkoxy, aryloxy, alkylthio, arylthio, alkyl, fluoro, fluoroalkyl, or further aryl or heteroaryl substituents.

It is also noted that a compound of formula (2) with one or more Ar units can be prepared using the conventional synthetic methods know in the art. Alternatively, certain compounds of formula (2) can be prepared from corresponding compounds of formula (1) via the polymerization method of this invention.

<Acid Catalyst>

Useful acids for implementing this invention include Lewis acids, protic acids, and polymeric acids.

Useful Lewis acids include the salts of transition metals such as zinc salts and iron salts, and the salts of non-transitional elements such as boron salts, tin salts, aluminum salts, antimonic salts, arsenic salts, bismuth salts, germanium salts, tellurium salts, and thallium salts. Exemplary boron-containing Lewis acid includes boron trihalides, such as boron trifluoride, boron trichloride and boron tribromide; and the complexes of boron trihalides, such as boron trifluoride dihydrate, boron trifluoride diethyl etherate, boron trifluoride-alcohol complex, boron trifluoride-methyl sulfide complex, boron trifluoride-phosphoric acid complex, and the like; with the boron trifluoride and its complexes being the preferable. Exemplary tin-containing Lewis acid includes tin(IV) chloride, tin(IV) bromide, tin(IV) fluoride, tin(IV) sulfate, and the like; with tin(IV) chloride being the preferable.

In a preferred embodiment of using a Lewis acid, the non-transitional Lewis acid is used, such as one of the above boron-containing and tin-containing Lewis acids, so that the electroactive polymer solution or coating formed with the method or from the composition of this invention is substantially transitional-metal free.

Any protic acid can be used as long as they can protonate at least one reactive staring molecule to convert it into a protonated form that would then initiate the coupling reaction with another non-protonated starting molecule. The useful protic acid may have an acidic proton with a $pK_a$ value of less than 20, preferably with a $pK_a$ value of less than 10, more preferably with a $pK_a$ value of less than 5, most preferably with a $pK_a$ value of less than 4. The lowest acidity required for an acid to function as an effective acid catalyst in this invention depends on the basicity of the reactive starting molecules used. In general, the higher the basicity of the reactive starting molecules, the lower the acidity of the protic acid may be required to initiate the polymerization. While for a given reactive starting molecule, the stronger acid catalyst will lead to a higher number of initiation and a faster chain propagation rate. Useful protic acid includes inorganic acids, organic acids, and polymeric acids. Illustrative useful inorganic acids includes HF, HCl, HBr, HI, $HNO_3$, $HNO_2$, $HBF_4$, $HPF_6$, $HSbF_6$, $H_2SO_4$, $H_2SO_3$, $H_2SeO_4$, $H_2SeO_3$, $H_2TeO_3$, $HClO_4$, $HClO_3$, $HClO_2$, $HClO$, $H_3AsO_4$, $H_3SbO_4$, and $H_3BiO_4$, fluorosulfuric acid, nitrosylsulfuric acid, superacids like fluoroantimonic acid and magic acid, sulfamic acid, phosphorous acid, phosphinic acid, phosphonic acid, phosphoramidic acid, phosphorodiamidic acid, phosphoric acid, pyrophosphoric acid, triphosphoric acid, oligophosphoric acid, polyphosphoric acid, metaphosphoric acid, trimetaphosphoric acid, polymetaphosphoric acid, and the like. Useful organic acids are substituted and unsubstituted aliphatic, cycloaliphatic, aromatic, or heteroaromatic compounds containing one or more acid functional groups selected from the groups consisting of sulfonic acid, sulfinic acid, sulfamic acid, sulfanilic acid, sulfuric acid, hydrogen sulfate, bisulfate, carboxylic acids, carbonic acid, phosphonic acid, phosphinic acid, phosphoric acid, hydrogen phosphate, dihydrogen phosphate, phosphonous acid, phosphonamidic acid, boric acid, and amino acid. Illustrative useful organic acids includes methanesulfonic acid, trifluoromethanesulfonic acid, ethanesulfonic acid, propanesulfonic acid, butanesulfonic acid, nonanesulfonic acid, decanesulfonic acid, dodecanesulfonic acid, hexadecanesulfonic acid, cetylsulfonic acid, isethionic acid, camphorsulfonic acid, camphorsulfinic acid, benzenesulfonic acid, benzenedisulfonic acid, benzenetrisulfonic acid, dihydroxybenzenedisulfonic acid, toluenesulfonic acid, octylbenzenesulfonic acid, dodecylbenzenesulfonic acid, methylisopropylbenzenesulfonic acid, mesitylenesulfonic acid, methoxybenzenesulfonic acid, 4-hydroxy-5-isopropyl-2-methylbenzenesulfonic acid, phenylaminobenzenesulfonic acid, naphthalenesulfonic acid, naphthalenedisulfonic acid, naphthalenetrisulfonic acid, hydroxynaphthalenesulfonic acid, dihydroxynaphthalenesulfonic acid, dihydroxynaphthalenedisulfonic acid, dinonylnaphthalenesulphonic acid, dinonylnaphthalenedisulphonic acid, anthracenesulfonic acid, phenanthrenesulfonic acid, chrysenesulfonic acid, pyrenesulfonic acid, tetracenesulfonic acid, pentacenesulfonic acid, naphthoquinonesulfonic acid, phthalocyanine sulfonic acid, phthalocyanine disulfonic acid, phthalocyanine tetrasulfonic acid, biphenylsulfonic acid, biphenyldisulfonic acid, haloalkanesulfonic acid, perfluorobutanesulfonic acid, perfluorooctanesulfonic acid, sulfanilic acid, sulfophthalic acid, sulfoacetic acid, 2-sulfoethyl acrylate, 3-sulfopropyl acrylate, 2-sulfoethyl methacrylate, 3-sulfopropyl methacrylate, vinylsulfonic acid, sulfosalicyclic acid, lauryl sulfate, dodecyl sulfuric acid, dodecyl hydrogen sulfate, trifluoroacetic acid, difluoroacetic acid, fluoroacetic acid, perfluoropropionic acid, perfluorobutyric acid, perfluorooctanoic acid, trichloroacetic acid, dichloroacetic acid, chloroacetic acid, haloalkanoic acid, perhaloalkanoic acid, oxalic acid, malonic acid, malic acid, citric acid, phthalic acid, formic acid, ascorbic acid, tartaric acid, methylsulfamic acid, nitrilotriacetic acid, nitrilotris(methylene)triphosphonic acid, methylenediphosphonic acid, phenylphosphonic acid, phenylphosphinic acid, ethylphosphonic acid, butylphosphonic acid, t-butylphosphonic acid, methyl dihydrogen phosphate, dimethyl hydrogen phosphate, naphthyl dihydrogen phosphate, phenyl phosphate, diphenyl phosphate, mono-(2-ethylhexyl) phosphate, bis(2-ethylhexyl) phosphate, di(2-ethylhexyl)phosphoric acid, and the like. Preferred organic acids are halogen substituted alkanoic acids, phosphorus-containing acids such as phosphonic acid, phosphinic acid, phosphoric acid, sulfur-containing acids such as sulfonic acids, sulfinic acids, sulfamic acids. More preferred organic acids are phosphorus-containing acids such as phosphonic acid, phosphinic acid, and phosphoric acid; sulfur-containing acids such as sulfonic acids, sulfinic acids, and sulfamic acids. Most preferred organic acids are sulfonic acids and phosphonic acid.

Useful polymeric acids can be any organic or inorganic oligomers or polymers being substituted with more than one acid functional groups selected from the groups consisting of sulfonic acid, sulfinic acid, sulfamic acid, sulfanilic acid, sulfuric acid, hydrogen sulfate, bisulfate, carboxylic acids, carbonic acid, phosphonic acid, phosphinic acid, phosphoric acid, hydrogen phosphate, dihydrogen phosphate, phosphonous acid, phosphonamidic acid, boric acid, and amino acid.

Illustrative useful polymeric acids include polystyrenesulfonic acid, polyacrylic acid, polymethacrylic acid, polymaleic acid, polyvinylsulfonic acid, sulfonated polystyrenes, sulfonated poly(vinyl naphthalene), sulfonated poly(vinyl arene)s, sulfonated poly(vinyl heteroarene)s, sulfonated copolymers or terpolymers that comprise at least one substituted or unsubstituted styrene repeat units, oligophosphoric acid, polyphosphoric acid, oligometaphosphoric acid, polymetaphosphoric acid, poly(ethylene phosphate), poly(propylene phosphate), and the like. The more preferred polymeric acids are polystyrenesulfonic acid, polyvinylsulfonic acid, sulfonated-polystyrenes, sulfonated copolymers or terpolymers that comprise at least one substituted or unsubstituted styrene repeat units, polyphosphoric acid, poly(ethylene phosphate), and poly(propylene phosphate), and combination mixtures, copolymers and terpolymers thereof.

The acid described above can be used either alone or as a mixture with one or more other acid(s). The amount of acid used to implement this invention can vary widely, depending on the desirable nature and properties that are intended to build in with the products. In general, a higher amount of acid catalyst will induce a higher number of initiations, leading to a smaller average molecular weight; while a lower amount of acid catalyst will induce a lower number of initiations, leading to greater average molecular weight. The leaving group released as in the form of HY (such as HBr or other acid) during the coupling polymerization step may participate to a certain extent as an effective acid catalyst for the subsequent polymerization steps. The extent of involvement of the in-situ released HY in the polymerization reaction varies, depending on the polarity and the basicity of starting material and the employed solvent. In general, the greater the basicity and the polarity of the starting material and/or the reaction solvent medium is the higher extent of the involvement of the in-situ released HY will be. Thus, an amount of acid catalyst as high as 20 equivalents (based on the mole number of the reactive starting molecules) or even greater can be used, if a low molecular weight polymers or oligomers such as dimers or trimers are intended to obtain. While, an amount of acid catalyst as low as 0.01-0.001 equivalents or less can also be used, if a high molecular weight polymer is intended to obtain or whenever the released HY can serve as an effective supplementary acid catalyst for performing the polymerization.

<Solvents>

The reactive starting molecules used to implement this invention can be either in a neat liquid form, a pure solid form, or a molten form, or as a solute form dissolving or dispersing in a given solvent medium. For example, a neat liquid of reactive starting material can be used to mix with a liquid acid catalyst, such as trifluoroacetic acid or a solid acid such as toluenesulfonic acid. The resultant mixture may form a single miscible liquid phase at the first moment, or it can form initially a two phase liquid/liquid or liquid/solid mixture systems that may then gradually turned into a single phase mixture as the polymerization proceeding with time. The reaction can also be carried out by mixing a solid starting material in a crystal form or in a fine powdery form with a liquid acid catalyst; the surrounding acid catalyst molecule will then initiate the polymerization starting from the surface of the solid. The starting material can also be an emulsion form or a small liquid drop form dispersing in a solvent medium with or without the aid of a surfactant, the added acid catalyst can then initiate the polymerization from the surface of or within the emulsion micelles or liquid drops, resulting in nano-sized and/or micrometer-sized conducting polymer particles. The reactive starting material can also be provided as thin liquid or solid coating layer that may be induced to undergo polymerization by contacting the coating with an acid vapor such as HCl, HBr, $BF_3$, or trifluoroacetic acid, resulting in a thin conducting layer of polyheteroaromatics in situ.

Any solvent or solvent mixture can be used as the desirable solvent medium in implementing the present invention as long as it can help dissolve or disperse, mix or contact the reactive starting molecules and acid catalyst. Illustrative of useful solvents include alcohols, linear and cyclic ethers, hydrocarbons, halogen-containing hydrocarbons, substituted aromatics, ketones, amides, nitriles, carbonates, sulfoxides and other sulfur containing solvents, nitro substituted alkanes and aromatics, water or mixtures thereof.

Exemplary alcohols include methanol, ethanol, isopropanol, and the like. Illustrative linear and cyclic ethers include tetrahydrofuran, tetrahydropyran, 2-methyltetrahydrofuran, diethyl ether, diglyme, glyme, dipropyl ether, dibutyl ether, methyl butyl ether, diphenyl ether, dioxane, diethylene glycol, ethylene glycol (EG), and the like. Illustrative aliphatic hydrocarbons include hexane, heptane, octane, nonane, decane, and the like. Exemplary halogen-containing hydrocarbons, include dichloromethane, chloroform, 1,2-dichloroethane, carbon tetrachloride, dichloroethane, dibromoethane, trichloroethane, tribromoethane, tetrachloroethane, and the like. Illustrative substituted aromatics include xylene, anisole, toluene, benzene, cumene, mesitylene, phenol, cresol, dichlorobenzene, chlorobenzene, and the like. Exemplary ketones include acetone, propanone, butanone, pentanone, hexanone, heptanone, octanone, acetophenone, and the like. Illustrative amides include dimethylformamide, N,N-dimethylacetamide, N-methyl-2-pyrrolidinone and the like. Exemplary nitriles include acetonitrile, propionitrile, benzonitrile, butyronitrile, and the like. Illustrative sulfoxides and other sulfur containing solvents include dimethylsulfoxide, and the like. Illustrative nitro substituted alkanes and aromatics include nitromethane, nitroethane, nitropropane, nitroisopropane, nitrobenzene, and the like. Exemplary carbonates include propylene carbonate, ethylene carbonate, and the like. Exemplary esters include ethyl acetate, methyl acetate, phenyl acetate, ethyl benzoate, and the like. In general, the amount of solvent or solvent mixture employed for the reaction media is not critical, so long as the reactive starting molecules and acid catalyst can be dissolved or dispersed, mixed or contacted with each other.

<Reaction Temperature and Reaction Time>

The useful reaction temperatures to implement this invention can vary widely, depending on the nature of the starting molecules and the purpose of applications. Since this invention provides a very effective method for making polyheteroaromatics, most of the polymerization can undergo efficiently to give essentially quantitative yields within rather short time interval (such as 5 to 30 minutes) at ambient temperatures, without the need of heating or cooling. So, from the economical point of view, it is most desirable to perform the reaction at ambient temperature, which is the most convenient and energy saving approach. While for the most reactive starting molecules, such as 2-bromo-3,4-alkylenedioxythiophene, or 2-bromo-furans, or 2-bromopyrroles, it may be desirable to use some lower reaction temperatures (such as 0° C.) for gaining more fine-tuning controls on the polymerization behaviors. For those least reactive starting molecules, such as 2-bromothiophenes bearing with directly attached electron-withdrawing groups, such as ketone, carboxylic acid, sulfonic acid groups, it may be desirable to use some higher reaction temperatures (30-60° C.) to increase the polymerization rate for shortening the overall reaction time. For the case of making conductive coating via the in-situ polymerization of a surface coating layer of the starting molecules via the included latent acid complex (such as acid-base complex), a heating treatment step may be needed to help remove the base and meanwhile release the acid catalyst for inducing the polymerization.

The useful reaction time to implement this invention can vary widely, depending on the nature of the starting molecules and the targeted properties of the polymer intended to obtain. In general, under optimal conditions, short reaction time (such as 0.1 to 2.5 hours) can provide polymers (having essentially quantitative yields) with narrower molecular weight distribution (i.e., having a small polydispersity, PDI, value) and higher regioregularity, while the longer reaction time can provide higher molecular weight polymer (also with essentially quantitative yields) but also with broader molecule weight distribution (i.e., with higher PDI values).

<Repeat Unit>

In general, the number of repeat units of the obtained conjugated heteroaromatic homopolymers or copolymers is not critical and may vary widely. The greater the number of repeat units, the greater the viscosity and molecular weight of the conjugated homopolymer or copolymer will be. In those applications where a conjugated homopolymer or copolymer of relatively low molecular weight and viscosity is required, such materials may be used, and in those applications where a conjugated homopolymer or copolymer of relatively high molecular weight and viscosity is required, then such materials can be used. The number of repeat units is at least about 4. The upper limit can vary widely depending on the desired molecular weight and viscosity and the required degree of processibility, such as melt processibility, solution processibility and the like. In the preferred embodiments of the invention, the number of repeat units is at least about 10, and in the particularly preferred embodiments, the number of repeat units is at least about 20. Amongst the particularly preferred embodiments, most preferred are those embodiments in which the number of repeat units is at least about 25.

<Different Embodiments for the Polymerization Procedure>

In some embodiments of the method for forming a conjugated heteroaromatic polymer of this invention, at least one compound of formula (1) is polymerized using an above-mentioned acid as a catalyst,

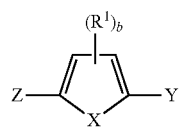
(1)

wherein X is selected from the group consisting of S, O, Se, Te, $PR^2$ and $NR^2$, wherein $R^2$ is selected from the group consisting of hydrogen, and substituted and unsubstituted alkyl, aryl, heteroaryl, alkanoyl, and aryloyl groups. Y is hydrogen (H), or a precursor of a good leaving group $Y^-$ whose conjugate acid (HY) has a $pK_a$ of less than 45. Z is hydrogen (H), silyl, or a good leaving group $Z^-$ whose conjugate acid (HZ) has a $pK_a$ of less than 45. The value b is 0, 1 or 2. $R^1$ is defined as above. The at least one compound of formula (1) being polymerized comprises at least one compound of formula (1) with Z=H and Y≠H.

In an embodiment, the at least one compound of formula (1) being polymerized consists of a single compound of formula (1) with Z=H and Y≠H. The conjugated heteroaromatic polymer thus obtained is a homopolymer having only one kind of repeating unit.

In another embodiment, the at least one compound of formula (1) being polymerized consists of two or more compounds of formula (1) with Z=H and Y≠H. It is possible that the two or more compounds of formula (1) with Z=H and Y≠H contain different combination sets of X, $R^1$ and b and are added in sequence to form two or more different polymer blocks.

In another embodiment, the more reactive compound of formula (1) with Z=H and Y≠H is polymerized with at least one less reactive compound selected from the group consisting of compounds (1) with Z≠H and Y≠H and compounds (1) with Z=H and Y=H. The compound of formula (1) with Z=H and Y≠H and the at least one less reactive compound may be polymerized at the same time. Alternatively, the more reactive compound of formula (1) with Z=H and Y≠H is polymerized first to form a polymer chain, and then the at least one less reactive compound is added to react with a terminal of the polymer chain and elongate the polymer chain. In still another embodiment, the at least one less reactive compound comprises two or more compounds, and the two or more compounds are added in a sequence to form two or more different polymer blocks.

In an embodiment, the at least one less reactive compound is selected from the group consisting of compounds (1) with Z≠H and Y≠H, or from the group consisting of compounds (1) with Z=H and Y=H.

In another embodiment, the at least one less reactive compound comprises at least one compound of formula (1) with Z≠H and Y≠H and at least one compound of formula (1) with Z=H and Y=H.

In the above embodiments, the compound of formula (1) with Z=H and Y≠H and the at least one less reactive compound may have different groups X. For example, a thiophene-based compound (X=S) as the compound of formula (1) with Z=H and Y≠H can be polymerized with a pyrrole-based compound (X=N) as the at least one less reactive compound.

In addition, when a compound (1) with Z=H and Y≠H is polymerized with another compound (1) with Z=H and Y≠H or with at least one less reactive compound as defined above, either a homopolymer or a copolymer can be obtained. Specifically, when each of X, $R^1$ and k of the compounds is fixed, a homopolymer is obtained; when either of X, $R^1$ and k is not fixed, a copolymer is obtained.

In some other embodiments of the method of this invention, at least one compound of formula (2) is polymerized using an above-mentioned acid as a catalyst,

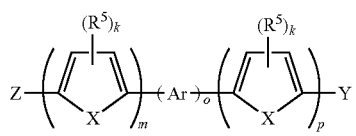
(2)

wherein X, Y, Z and Ar are defined as above. The values m, o and p are each independently an integer equal to or greater than 0, with a proviso that m+p≥1. Each k is independently 0, 1 or 2. $R^5$ is defined as above, wherein any two $R^5$ on the same ring or on neighboring rings, or any $R^5$ and a substituent group on a neighboring Ar ring, may join together to form another ring. The at least one compound of formula (2) being polymerized comprises at least a compound with Z=H and Y≠H.

In an embodiment, the at least one compound of formula (2) being polymerized comprises a plurality of compounds of formula (2) with Z=H and Y≠H having different m+p values, with o=0 and m+p≥4. This corresponds to a case where oligomeric or polymeric molecules are further polymerized with each other to form polymers with greater molecular weights.

In another embodiment, with o=0, the at least one compound of formula (2) being polymerized comprises a plurality of compounds with Z=H and Y≠H having different m+p values each being equal to or greater than 4, and at least one less reactive compound selected from the group consisting of compounds of formula (2) with Z≠H, Y≠H and m+p=1, and compounds of formula (2) with Z=H, Y=H and m+p=1. This corresponds to a case where monomers are added to oligomeric or polymeric chains to elongate the chain.

In an embodiment, the conjugated heteroaromatic copolymer formed from the method using at least one compound of formula (1) includes a fragment expressed by formula (3):

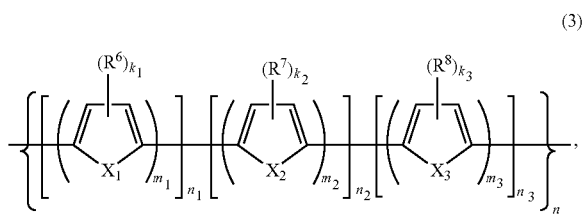

(3)

wherein n is an integer equal to or greater than 1, $m_1$, $m_2$ and $m_3$ are independently integral equal to or greater than 2, and $n_1$, $n_2$ and $n_3$ are independently 1 or 0. $X_1$, $X_2$, and $X_3$ are the same or different, and are independently selected from the group consisting of S, O, Se, Te, $PR^2$ and $NR^2$, wherein $R^2$ is selected from the group consisting of hydrogen, and substituted and unsubstituted alkyl, aryl, heteroaryl, alkanoyl, and aryloyl groups. The values $k_1$, $k_2$ and $k_3$ are independently 0, 1 or 2. $R^6$, $R^7$, and $R^8$ are the same or different substituent and can be selected from permissible $R^5$ groups, wherein any two $R^6$ or two $R^7$ or two $R^8$ groups on the same ring may join together to form another ring. In formula (3), there is a proviso that any two neighboring blocks have different repeat units.

The conjugated heteroaromatic copolymer formed from the method using at least one compound of formula (2) includes a fragment expressed by formula (4):

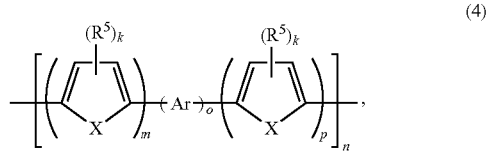

(4)

wherein n is an integer equal to or greater than 4. X is the same or different at each occurrence, and is selected from the group consisting of S, O, Se, Te, $PR^2$ and $NR^2$, wherein $R^2$ is selected from the group consisting of hydrogen, and substituted or unsubstituted alkyl, aryl, heteroaryl, alkanoyl, and aryloyl groups. Ar is a substituted or unsubstituted, mono- or poly-nuclear, aryl or heteroaryl ring. The value k is 0, 1 or 2. Each $R^5$ is a substituent, wherein the two $R^5$ on the same ring or on neighboring rings, or $R^5$ and a substituent group on a neighboring Ar ring, may join together to form another ring. The values m, o and p are each independently an integer equal to or greater than 0, with a proviso that $m+p \geq 1$.

In some embodiments, the conjugated heteroaromatics copolymers are alternative copolymers having two or more different types of repeat units alternatively appeared along the polymer chain.

An example of such a copolymer is formed by first polymerizing a compound having a specific set of $X_1$, $R^6$ and $k_1$ and with Z=H and Y≠H to form a polymer chain, and then adding at least one less reactive compound defined as above and having a different combination set of $X_2$, $R^7$ and $k_2$ to react with the terminals of the polymer chains and elongate the polymer chains to form a diblock copolymer. Similarly, another less reactive defined as above and having a different combination set of $X_3$, $R^8$ and $k_3$ can then be added subsequently to react with the terminals of the polymer chains and elongate the polymer chains to form a triblock copolymer. If the combination set of $X_3$, $R^8$ and $k_3$ is different from the combination set of $X_1$, $R^6$ and $k_1$, then an ABC type of triblock copolymer is yielded. Whereas, if the combination set of $X_3$, $R^8$ and $k_3$ is the same as the combination set of $X_1$, $R^6$, and $k_1$, then an ABA type of triblock copolymer is yielded. Likewise, multi-block copolymers of any types can be similarly prepared.

In some examples of the conjugated heteroaromatic copolymer, one of $X^1$ and $X^2$ represents S and the other of $X^1$ and $X^2$ represents O, Se, Te, $PR^2$ and $NR^2$.

<Dopants>

The conjugated homopolymer or copolymer, as used in this invention, can be either in the neutral undoped (non-conductive) form(s) or in the conductive and doped forms with various doping degrees.

In the case of conductive and doped forms, the heteroaromatic homopolymer or copolymer can be doped with a suitable dopant to render the polymer electrically conductive. Dopants for use in general can be such materials which are known in the art for use in doping conjugated backbone homopolymer or copolymers to form conductive or semi-conductive polymers, such as oxidizing dopants can be used. Illustrative of useful oxidizing dopants are $AsF_5$, $NO^+$ and $NO_2^+$ salts (such as $NOBF_4$, $NOPF_6$, $NOSbF_6$, $NOAsF_6$, $NO_2BF_4$, $NO_2PF_6$, $NO_2AsF_6$, $NO_2SbF_6$, and the like), $HClO_4$, $HNO_3$, $H_2SO_4$, $SO_3$, $I_2$, and Fe(III) salts (such as $FeCl_3$, $Fe(OTs)_3$, $Fe(CF_3SO_3)_3$, and the like). Illustrative of other dopants includes protonic acid dopants. Such dopants include inorganic acids, such as hydrofluoric acid, hydroiodic acid, nitric acid, boric acid, sulfuric acid, $HNO_2$, $HBF_4$, $HPF_6$, $HSbF_6$, $H_2SO_3$, $H_2SeO_4$, $H_2SeO_3$, $H_2TeO_3$, $HClO_4$, $HClO_3$, $HClO_2$, $HClO$, $H_3AsO_4$, $H_3SbO_4$, $H_3BiO_4$, nitrosylsulfuric acid, fluorosulfuric acid, pyrophosphoric acid, triphosphoric acid, superacids like fluoroantimonic acid and magic acid, sulfamic acid, phosphorous acid, phosphinic acid, phosphonic acid, phosphoramidic acid, phosphorodiamidic acid, phosphoric acid, pyrophosphoric acid, triphosphoric acid, oligophosphoric acid, polyphosphoric acid, metaphosphoric acid, trimetaphosphoric acid, polyrnetaphosphonic acid, and the like.

Other protonic acid dopants are organic acids, such as substituted and unsubstituted aryl, heteroaryl, alkyl, or cycloalkyl compounds containing one or more acid functional groups selected from the groups consisting of sulfonic acid, sulfinic acid, sulfamic acid, sulfanilic acid, sulfuric acid, hydrogen sulfate, bisulfate, carboxylic acid, phosphonic acid, phosphinic acid, phosphoric acid, hydrogen phosphate, dihydrogen phosphate, phosphonous acid, phosphonamidic acid, boric acid, and amino acid. Preferred organic acid dopants are substituted and unsubstituted aryl, heteroaryl, or alkyl compounds containing at least one acid functional groups selected from the groups consisting of sulfonic acid, sulfinic acid, sulfamic acid, sulfanilic acid, sulfuric acid, hydrogen sulfate, bisulfate, carboxylic acid, phosphonic acid, phosphinic acid, phosphoric acid, hydrogen phosphate, and dihydrogen phosphate.

Yet, other useful acid dopants are polymeric acids. Useful polymeric acid dopants can be any organic or inorganic oligomers or polymers being substituted with more than one acid functional group selected from the groups consisting of sulfonic acid, sulfinic acid, sulfamic acid, sulfanilic acid, sulfuric acid, hydrogen sulfate, bisulfate, carboxylic acids, carbonic acid, phosphonic acid, phosphinic acid, phosphoric acid, hydrogen phosphate, dihydrogen phosphate, phosphonous acid, phosphonamidic acid, boric acid, and amino acid. Illustrative useful polymeric acid dopants include polystyrenesulfonic acids, polyacrylic acids, polymethacrylic acids, polymaleic acids, polyvinylsulfonic acids, sulfonated polystyrenes, sulfonated poly(vinyl naphthalene)s, sulfonated poly(vinyl arene)s, sulfonated poly(vinyl heteroarene)s, sulfonated copolymers or terpolymers comprising at least one substituted or unsubstituted styrene repeat units, oligophosphoric acids, polyphosphoric acids, oligometaphosphoric acids, polymetaphosphoric acids, poly(ethylene phosphate)s, poly(propylene phosphate)s, and combination mixtures, copolymers and terpolymers thereof.

The preferred polymeric acid dopants are polystyrenesulfonic acids, polyvinylsulfonic acids, sulfonated-polystyrenes, sulfonated copolymers or terpolymers that comprise at least one substituted or unsubstituted styrene repeat units, polyphosphoric acids, poly(ethylene phosphate)s, and poly(propylene phosphate)s, and combination mixtures, copolymers and terpolymers thereof.

The acid dopants may be derived completely or partly from the acid catalyst; they can also be derived completely or partly from the latent dopant precursors, such as from the salt, ester, and anhydride forms of any desirable acid dopants. Alternatively, some of the acid dopants may be derived directly or indirectly from the reaction byproducts of the compounds of formula (1) and/or (2). For one embodiment of this invention, the acid dopants may be derived from the leftover acid catalyst used to initiate the polymerization. For another embodiment of this invention, the acid dopants may be the combination of the acid catalyst and the acidic byproducts produced directly or indirectly from the polymerizations or coupling reactions of formula (1) and/or (2). Yet another embodiment may involve the use of latent dopant precursors, which are converted completely or partly into the final acid dopants by the reaction with the acid catalyst and/or with the byproducts produced directly or indirectly from the polymerizations or coupling reactions of formula (1) and/or (2). Alternatively, the convention of the latent dopant precursors into the final acid dopants can also be conducted by thermal treatments (such as by heating) or photochemical treatments (such as by exposing with photon or Laser) or electrochemical treatments during or after the polymerization of formula (1) and/or (2). Yet another interesting embodiment may involve an ultimate dopant system that can be derived from the combination of an organic or inorganic acid catalyst, plus some thermally convertible or chemically convertible or photo-chemically convertible or electrochemically convertible latent dopant precursors of one or more polymeric acid(s), and plus some of the acidic reaction byproduct(s) generated directly or indirectly from the polymerization and/or coupling reactions of the compounds of formula (1) and/or (2). Actually, any combination of the types, forms, original sources and/or production methods of the acid dopants may be used as needed or as desired.

In the cases of highly electron-rich polyheteroaromatic systems, poly(ethylene-3,4-dioxythiophene) (PEDOT), air can even work as an effective oxidant and/or dopant.

<Doping Degree and Conductivity>

The amount of dopant added to the conjugated backbone homopolymer or copolymer is not critical and may vary widely. In general, sufficient dopant is added to the homopolymer or copolymer to at least form doped polymer that is a semi-conductor, which has a conductivity of at least about $10^{-12}$ ohm$^{-1}$ cm$^{-1}$. The upper level of conductivity is not critical and depends on the type of homopolymer or copolymer employed. In general, for those applications utilizing the conductivity property, the highest level of conductivity obtained is provided without unduly adversely affecting the environmental stability of the conjugated backbone homopolymer or copolymer.

In the various embodiments of the present invention, the amount of dopant employed is sufficient to provide a conductivity of at least about $10^{-9}$ ohm$^{-1}$cm$^{-1}$. In particularly preferred embodiments according to the present invention, the amount of dopant is sufficient to provide a conductivity of about $10^{-2}$ ohm$^{-1}$cm$^{-1}$ to about $10^{+3}$ ohm$^{-1}$cm$^{-1}$.

<Potential Applications>

The polyheteroaromatic prepared according to the present invention can be used for any purpose. For example, where such blends are electrically conductive, they can be used in the fabrication of articles that comprise electrically conductive portions and electrically non-conductive portions, and articles that are completely electrically conductive. Examples of useful applications include electrically conductive polymer housings for EMI shielding of sensitive electronic equipment such as microprocessors; infrared, radio frequency and microwave absorbing shields; flexible electrical conducting connectors; conductive bearings and brushes; semiconducting photoconductor junctions; electrodes; capacitors; field effect transistors; organic memory devices; solar cell device; photovoltaic cells; super capacitor; sensors; smart cards; nonlinear optical materials; medical applications; artificial muscle; reinforcement materials and/or additives; optically transparent or non-transparent corrosion-preventing coatings for corrodible materials such as steel; antistatic materials and optically transparent or non-transparent coatings for packaging electronic components; antistatic carpet fibers; antistatic waxes for floors in computer rooms; antistatic finishes for CRT screens, aircraft, and auto windows, and the like.

Various other applications involve the use of the electroactive coatings of polyheteroaromatics produced according to the present invention include applications such as conductive plastic gas tanks; solar window coatings; transparent electrical elements for heated windows and heated liquid crystal displays; electrochromic displays, electrical contacts for electroluminescent displays and electroluminescent lights, and electrical contacts for piezoelectric films for transparent loud speakers; transparent conducting coatings for windows in burglar alarm systems; membrane coatings for chemical separations (such as $O_2$ and $N_2$, for example), and conducting coatings for membrane switches, and a discharge layer or photoresist layer for lithographic process.

Applications involving use of the electroactive coating comprising a conjugated heteroaromatic polymer produced according to this invention include applications such as capacitors, supercapacitors, secondary battery, antistatic objects such as antistatic textiles, antistatic packaging and buffering materials (e.g., antistatic foams, wraps, bags, trays, cases, boxes, and the like), DSSC and PV solar cells, LED, electroactive coatings for membrane switches, transparent electroactive coating layer for touch screens, electroactive coating layer for touch panels, electroactive coatings for flexible electronic devices, electroactive coating for capacitor microphones, via hole conductive coating for circuitry board, and a discharge layer or photoresist layer for a lithographic process.

The composition of this invention is particularly useful for conductive ink applications. The used polymerization retardant can help suppress the polymerization of the electroactive monomers in the ink formula before the printing, so that the flowing ability of the ink can be maintained. While the use of a soluble polymer binders can render the ink formula with a suitable viscosity for printing. The polymerization can be initiated after printing by performing at least one of a step of raising the temperature of the substrate, a step of evaporating partly the solvent in the composition, and a step of evaporating partly or completely the polymerization retardant used as the functional additive in the composition. Alternatively, the conductive ink formula can utilize the electroactive solution pre-prepared from the composition of this invention, as long as the electroactive polymers can be maintained in the soluble or dispersible forms by the help of a suitable functional additive used in the composition, such as an emulsifier, a polymer binder, a surfactant, and/or a dispersion stabilizer. Likewise, the composition of this invention and/or the electroactive solution prepared therefrom is particularly useful for large area printing or coating applications. The added polymer binder also help enhance the mechanical strengths of the electroactive coatings of this invention, making them even more suitable for the applications of various displays and electrochromic window devices (that require long term durability and high thermal stability), such as electrochromic displays, electroluminescent displays, and liquid crystal displays, solar window, smart windows, electrochromic sunroof, electrochromic windows, electrochromic liquid crystal windows, touch panels, and touch screens.

The electroactive coatings with much improved mechanical strength and thermal stability are also particularly useful for the various electroactive objects (such as antistatic, electrostatic dissipation, EMI shielding, infrared, radio frequency and microwave absorbing shields, and smart cards), electronic devices (such as LED, field effect transistors, organic memory devices, solar cell device, photovoltaic cells, supercapacitor, and sensors), and flexible electronic articles (such as flexible electronic membranes, contacts, wires, electrodes, connectors, and devices).

Furthermore, the composition of this invention is particularly useful for making high quality solid capacitors with much superior performances, such as high static capacitance, low ESR (equivalent series resistance), low DF (dissipation factor), high thermal stability ($\geq 240°$ C.), high mechanical strength, long lifetime (>>7500 hours at 125° C.), and small size. The polymerization retardant used in the composition of this invention can retard the polymerization activity until all the pores of a capacitor element has been fully filled with the composition, so that the pore-filling rate (and thus the surface-covering rate) of the dielectric layer by the electroactive electrolyte can be greatly boosted up to achieve a much higher static capacitance, and meanwhile having a lower ESR and DF values. The simultaneous use of polymerization retardant and polymer binder as the functional additives can further increase the static capacitance up to >95% of the theoretical values (with the need of only one time coating operation), which are much higher than the achievable capacity (~50-60% of the theoretical values) for a solid capacitor prepared by the conventional method. The much higher pore-filling rate plus the use of polymer binder can further enhance the mechanical strengths and thermal stability of the solid capacitor fabricated in this invention, so that they can survive under extreme working environments, such as having high mechanical stresses (caused by the constant vibrational and mechanical motions as encountered in the applications of automobile electrical and electronic equipment and audio-video appliance) and having high working temperatures (caused either by the outdoor solar radiation heat or by the interior heat dissipated or exhausted from the application devices). Thus, the solid capacitors fabricated from the composition and/or the method of this invention are particularly suitable for the applications of automobile electrical and electronic equipment, audio-video appliance, the inverters and/or converters for solar cells and photovoltaic cells, computer servers, LED lighting systems, power generators, and power supplies. Whereas, the solid capacitors fabricated by the conventional methods and formulas are in general suffering low pore-filling rate (~50-60%) and thus having a very poor mechanical strengths associated with the electroactive-polymer-coated dielectric layer and especially for the dielectric pores that are either non-filled or only partly filled. The constant vibrational and mechanical motions generated by the operations of automobile and AV appliances would create a great deal of micro-cracks, in relative short period of service time, on the non-filled or partly filled area of the dielectric layer, resulting in much increased LC (leakage current) and eventually leading to a short-circuit damage of the solid capacitor. Since the micro-cracks appeared in the non-filled or partly filled pores of the dielectric layer (where are also the most fragile and easily damaged locations) are not readily reachable by the immobile solid electrolyte, thus their constantly appeared micro-cracks cannot be readily and efficiently repaired electrochemically. Hence, the conventional pure solid capacitors are not suitable for such applications. Therefore, currently only the hybrid capacitor having a combination of solid electrolyte coating (for providing a better conductive electrolyte to render the capacitor with a relatively lower ESR) and a liquid electrolyte (for filling the pores that are either non-filled or partly filled by the solid electrolyte to render the capacitor with repairing ability in those most fragile areas) can be used for such applications.

Interestingly, the pure solid capacitors prepared from the composition and method of this invention are essentially free of non-filled or partly filled areas (i.e., with a pore-filling rate of 95-100%), they are essentially free of fragile areas. Furthermore, the much improved mechanical strength of the solid electrolyte itself and the much enhanced interfacial adhesions between the solid electrolyte and all other surfaces of the capacitor element (including anode dielectric layer, the separators, and the cathode foil) render the resultant capacitors as a whole solid pieces of device. Thus, the pure solid capacitors prepared from this invention can easily withstand the vibrational stresses and mechanical impacts, keeping the damage degree of the dielectric layer always very low during their service life. These limited damage defects are all reachable and repairable by the solid electrolyte and can be readily and facilely repaired electrochemically, without the need of using additional liquid electrolyte. Thus, the pure solid capacitors of this invention are particularly workable for the applications having constant vibrational stresses and mechanical impacts, such as automobile electrical and electronic equipment and audio-video appliance. In addition, owing to the combined advantages and controllability provided by the functional components of both polymerization retardant and polymer binder, the compositions and/or the electroactive solutions of this invention are particular suitable for the preparation of capacitors of various types (such as radial-, dip-, SMD-, V-chip-, and chip-type) based on various valve-metal (such as Ta-, Nb-, and Al-based) systems.

The electroactive coatings and solutions can be prepared from the preformed conjugated polymer products of this invention by any suitable method known in the art. Since the polymerization method of this invention also provide a very clear polymer solution (i.e., free of undesirable impurities and byproducts), the resultant polymerization solution obtained after the polymerization process can also be directly applied to prepare an electroactive coating. Alternatively, the electroactive coating and/or solutions can be prepared by an in-situ polymerization process from the mixture solution containing the monomer and the acid catalyst. In a preferred embodiment of this invention, the electroactive coating or solution is performed by using the composition of this invention that comprises a monomer, an acid catalyst, and at least one functional component selected from the group consisting of a solvent, a polymerization retardant, a polymer binder, a dopant, a latent dopant, a dielectric layer protection agent, a dielectric layer repair agent, a plasticizer, an impact modifier, a reinforcing filler, a blowing agent, a crosslinking agent, an ultraviolet stabilizer, a flame retardant, a photoresist, a thickening agent, a defoaming agent, an emulsifier, a surfactant, and a dispersion stabilizer. In a more preferred embodiment, the at least one functional component contains at least one polymerization retardant so that the polymerization activity of the composition of this invention can be controlled as desired. In a further preferred embodiment, the at least one functional component contains at least one polymerization retardant and one polymer binder so that both the polymerization behaviors of the composition and the application properties of the resultant products of this invention can be further controlled and optimized as desired.

The following examples are presented to more particularly illustrate the present invention, and should not be construed as being limitations on the scope and spirit of the present invention.

Figure 2A:
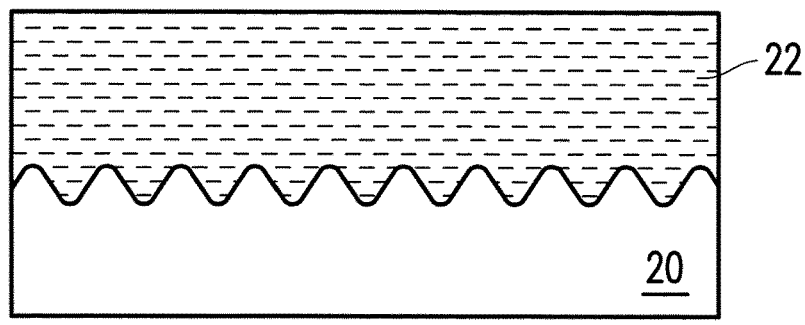
FIGS. 2A-2C illustrate, in a cross-sectional view, an application of the method of this invention wherein the polymerization of at least one compound of formula (1) or (2) is performed over a surface of a substrate to form an organic conductive film.
Figure 2B:
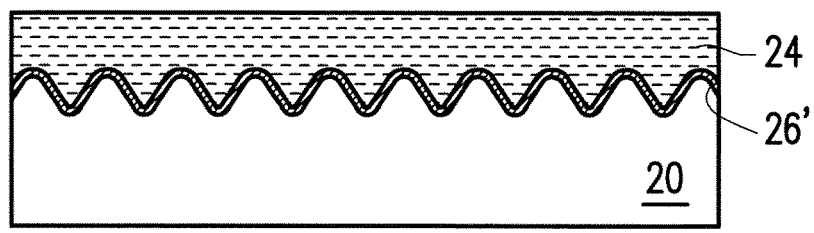
Figure 2C:
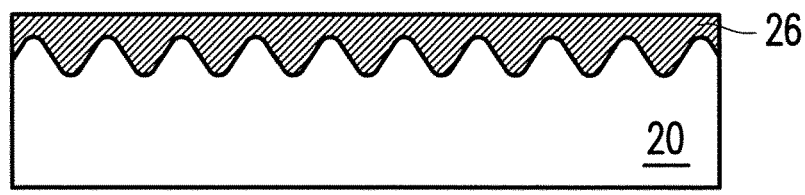

For example, FIGS. 2A-2C illustrate, in a cross-sectional view, an application of the method of this invention wherein the in-situ polymerization of at least one compound of formula (1) or (2) is performed over a surface of a substrate to form an organic conductive film.

Referring to FIG. 2A, a solution 22 of a compound of formula (1) and/or (2) with Z=H and Y≠H at a desirable low concentration together with an appropriate amount of acid catalyst in a proper solvent or cosolvent mixture is applied to a substrate 20 at a desirable low temperature so that the polymerization activity is limited. The substrate 20 may be any substrate requiring a surface conductive coating, such as a substrate of an electrode, a solar cell, a window, a panel, a screen; or a corrodible material, an electroactive object, a circuitry board, a textile, a fiber, a plastic, a paper, a nonwoven pad, a flexible glass, a ceramic, an epoxy board, a LED or an antistatic object. Particularly, the substrate 20 may be a porous substrate used for fabricating a capacitor, as illustrated in the figure.

Referring to FIG. 2B, a polymerization reaction of this invention is performed and/or initiated on the substrate 20 to form an organic conductive polymer solution or film on the substrate 20 by either raising the temperature of the substrate 20 or evaporating partly or fully the solvent to facilitate the polymerization. For example, as shown in the figure, the solvent is partly removed through evaporation to yield a more concentrated monomer solution to initiate the polymerization, resulting in a concentrated solution 24 of the conductive polymer on the substrate, wherein a thin layer 26' of the conductive polymer in the form of precipitates may be deposited on the surface of the substrate 20. In some case, although some polymerization might have been started in the premixing stage to yield some oligomers or lower molecular weight polymers in the casting solution, the oligomer or polymer molecules can undergo continuous polymerization effectively when the solution becomes more concentrated in the later solvent-evaporation stage, leading to higher molecular weight polymers and resulting in a polymer coating with greater mechanical strength and higher conductivity.

Referring to FIG. 2C, the remaining solvent is fully removed from the concentrated solution 24 of the organic conductive polymer, leaving an organic conductive polymer film 26 on the substrate 20.

In a preferred embodiment, the electroactive polymer solutions or surface coatings are prepared using the composition of this invention.

<Composition for Forming Electroactive Polymer Solution or Coating>

The composition for forming a conjugated heteroaromatic polymer solution or coating of this invention comprises the aforementioned at least one compound of formula (1) as a monomer that comprises at least one compound of formula (1) with Z=H and Y≠H or the aforementioned at least one compound of formula (2) as a monomer that comprises at least one compound of formula (2) with Z=H and Y≠H, an acid as a polymerization catalyst selected from the group consisting of a protic acid, a polymeric acid, and a non-transitional Lewis acid, and at least one functional component selected from the group consisting of a solvent, a polymerization retardant, a polymer binder, a dopant, a latent dopant, a dielectric layer protection agent, a dielectric layer repair agent, a plasticizer, an impact modifier, a reinforcing filler, a blowing agent, a crosslinking agent, an ultraviolet stabilizer, a flame retardant, a photoresist, a thickening agent, a defoaming agent, an emulsifier, a surfactant, and a dispersion stabilizer. In a preferred embodiment, the at least one functional component contains at least a polymerization retardant. In a more preferred embodiment, the at least one functional component contains at least a polymerization retardant and a polymer binder.

The at least one compound of formula (1) contained in the composition may consist of a single compound of formula (1) with Z=H and Y≠H, or may include a combination of two or more compounds of formula (1) including at least one compound of formula (1) with Z=H and Y≠H, as mentioned in the above embodiments. The at least one compound of formula (2) contained in the composition may consist of a single compound of formula (2) with Z=H and Y≠H, or may include a combination of two or more compounds of formula (2) including at least one compound of formula (2) with Z=H and Y≠H, as mentioned in the above embodiments. In some desirable embodiments, the composition may contain compounds of both formula (1) and formula (2), with the proviso that at least one of the compounds of formula (1) or formula (2) has a structure with Z=H and)(Ai.

The acid as the polymerization catalyst and the solvent are as exemplified above.

The polymerization retardant can slow down or inhibit the polymerization activity of the mixture solution of the monomer and the acid catalyst of this invention, so that the initiation timing and the rate of polymerization can be better controlled as desired.

The polymerization retardant includes a Lewis base having a stronger basicity than the monomer. In a preferred embodiment, the Lewis base is a compound containing at least one atom having lone pair electrons, wherein the at least one atom having lone pair electrons may be preferably selected from the group consisting of O, N, S and P atoms. Examples of the effective O-containing Lewis base include: $H_2O$; alcohols such as methanol, ethanol, propanol, isopropanol, butanol, isobutanol, t-butyl alcohol, cyclopentanol, cyclohexanol, ethylene glycol, and so on; ketones such as acetone, ethyl methyl ketone, cyclopentanone, cyclohexanone, hexafluoroacetone, acetylacetone, and so on; ethers such as dimethyl ether, ethyl methyl ether, diethyl ether, tetrahydrofuran, tetrahydropyran, dioxane, and so on; esters such as methyl acetate, ethyl acetate, methyl benzoate, phenyl benzoate, and so on; symmetric or asymmetric cyclic and acyclic carbonate esters such as dimethyl carbonate, diethyl carbonate, dipropyl carbonate, dibutyl carbonate, dipentylcarbonate, diphenyl carbonate, ethyl methyl carbonate, ethyl butyl carbonate, methyl phenyl carbonate, benzyl phenyl carbonate, methoxyphenyl nitrophenyl carbonate, ethylene carbonate, propylene carbonate, butylene carbonate, 4-ethyl-1,3-dioxan-2one, 4-ethyl-6-propyl-1,3-dioxan-2one, and so on; siloxanes such as hexamethyldisiloxane, hexamethylcyclotrisiloxane, and so on; and O-containing polymers such as substituted and unsubstituted polyethers, polyacetals, polyesters, polyketones, polyetherketones, polyetheretherketones, poly(phenylene oxide)s, poly(ethylene oxide)s, poly(propylene oxide)s, poly(ethylene glycol)s, poly(propylene glycol)s, poly(vinyl acetate)s, poly[ethylene-co-(vinyl acetate)]s, polyvinyl alcohols, poly[ethylene-co-(vinyl alcohol)]s, polysiloxanes, polyacrylates, polymethacrylates, and so on.

Examples of the effective N-containing Lewis base include: amines, such as methylamine, dimethylamine, trimethylamine, ethylamine, diethylamine, triethylamine, aniline, N-methylaniline, N,N-dimethylaniline, pyrrolidine, piperidine, morpholine, quinuclidine, 3-pyrroline, and so on; amides, such as 1-methyl-2-pyrrolidinone, 2-pyrrolidinone, N,N-dimethylformamide, N,N-dimethyl acetamide, and so on; imides, such as phthalimide, uracil, thymine, cytosine, and so on; nitriles, such as acetonitrile, benzonitrile, and so on; N-containing heterocyclic compounds and N-containing heteroaromatic compounds, such as imidazole, 2-methylimidazole, pyrazole, triazole, pyridine, pyridazine, pyrazine, indole, quinoline, pyrimidine, purine, adenine, guanine, and so on; N-containing polymers, such as substituted and unsubstituted polyamines, polyamides, polyimides, polyetherimides, polyureas, polyurethanes, polyphosphazenes, polyvinylpyridines, polyvinylpyrrolidones, and so on.

Examples of the effective S-containing Lewis base include: sulfides, such as dimethyl sulfide, diethyl sulfide, tetrahydrothiophene, tetrahydrothiapyran, and so on; sulfoxides, such as dimethylsulfoxide, tetramethylene sulfoxides, and so on; sulfones, such as dimethylsulfone, tetramethylene sulfone, and so on; sulfites, such as dimethyl sulfite, diethyl sulfite, and so on; and S-containing polymers, such as substituted and unsubstituted poly(phenylene sulfide)s, poly(alkylene sulfide)s, polysulfones, polythioacetals, and polythioketals, etc.

Examples of the effective P-containing Lewis base include: phosphines, such as triphenylphosphine, trimethylphosphine, tributylphosphine, tricyclohexylphosphine, di-t-butylphosphine, tris(dimethylamino)phosphine, and so on; phosphine oxides, such as trioctylphophine oxide, triphenylphosphine oxide, and so on; phosphites such as dimethylphosphite, di-t-butylphosphite, tributylphosphite, triphenylphosphite, tetraethyl pyrophosphite, and so on; phosphonates, such as diethyl ethylphosphonate, diphenyl benzylphosphonate, and so on; phosphates, such as trimethylphosphate, triphenylphosphate, and so on; phosphoramides, such as hexamethylphosphoramide and hexaethylphosphoramide, and so on; and P-containing polymers, such as substituted and unsubstituted polyphosphazenes, poly(ethylene phosphate)s, poly(propylene phosphate)s, and so on.

<Polymer Binders>

Any polymer binders can be used as long as they help increase the viscosity of the composition, or enhance the mechanical strength of the resultant solid polymer electrolyte, or increase the thermal stability of the resultant solid polymer electrolyte, or help improve the electric current transportation morphology of final solid polymer matrix, or help strengthen the interfacial adhesion between the solid electrolyte and the anode foil, cathode foil, and the separators, or even help improve the solubility and/or dispersion ability of the solid electrolyte in the desirable electroactive solution. Furthermore, some of the polymer binders can serve for more than one function. For example, some desirable polymeric acids can serve as the acid catalyst, the polymer binder, and the final acid dopant, such as poly (glycolic acid)s, poly(lactic acid)s, polystyrenesulfonic acids, polyacrylic acids, polymethacrylic acids, polymaleic acids, polyvinylsulfonic acids, sulfonated polystyrenes, sulfonated poly(vinyl naphthalene)s, sulfonated poly(vinyl arene)s, sulfonated poly(vinyl heteroarene)s, sulfonated copolymers or terpolymers comprising at least one substituted or unsubstituted styrene repeat units, oligophosphoric acids, polyphosphoric acids, oligometaphosphoric acids, polyrnetaphosphoric acids, poly(ethylene phosphate)s, poly (propylene phosphate)s, and the combination mixtures, copolymers, terpolymers, and polymers thereof.

In another embodiment, some polymer can serve as the polymerization retardant and polymer binder, such as O-containing polymers like substituted and unsubstituted polyethers, polyacetals, polyesters, polyketones, polyetherketones, polyetheretherketones, poly(phenylene oxide)s, poly(ethylene oxide)s, poly(propylene oxide)s, poly(ethylene glycol)s, poly(propylene glycol)s, poly(vinyl acetate)s, poly[ethylene-co-(vinyl acetate)]s, polyvinylalcohols, poly [ethylene-co-(vinyl alcohol)]s, polysiloxanes, polyacrylates, and polymethacrylates; or N-containing polymers, such as substituted and unsubstituted polyamines, polyamides, polyimides, polyetherimides, polyureas, polyurethanes, and polyphosphazenes, polyvinylpyridines, polyvinylpyrrolidones; or S-containing polymers, such as substituted and unsubstituted poly(phenylene sulfide)s, poly(alkylene sulfide)s, polysulfones, polythioacetals, and polythioketals, or P-containing polymers, such as substituted and unsubstituted polyphosphazenes, poly(ethylene phosphate)s, poly (propylene phosphate)s.

Any natural or synthetic homopolymers, copolymers, or polymer mixtures can be used as the polymer binder as long as it is soluble or dispersible in the composition. Useful polymer binders include thermosetting plastics and thermoplastic plastics. When thermosetting plastics are used, the polymer binders are prepared in-situ, during the polymerization of the conjugated polyheteroaromatic polymers, from a soluble monomer, oligomer, or polymer precursor plus a crosslinking or coupling reagent. The preferred polymer binders are substituted and unsubstituted thermoplastic homopolymers, copolymers, terpolymers, or polymer mixtures. Illustrative useful thermoplastic polymers include substituted or unsubstituted polyethylenes, polypropylenes, polyolefins, poly($\alpha$-olefin)s, polyalkenes, polypentenamer, polyoctenamers, polycaprolactones, nylons, polycaprolactams, polyamides, polyamines, polyphosphazenes, polyesters, PET, poly(butylene terephthalate)s, poly(trimethylene terephthalate)s, poly(glycolic acid)s, poly(lactic acid)s, poly(4-hydroxybenzoate)s, polyacrylates, polymethacrylates, polyacrylamides, polyacrylonitriles, poly(trialkylsilyl methacrylate)s, polystyrenes, poly(styrenesulfonic acid)s, poly(styrene sulfonate)s, poly(alkyl styrenesulfonate)s, polyphosphoric acids, poly(ethylene phosphate)s, poly(propylene phosphate)s, PS-PMMA copolymers, PMMA, polybutadienes, polychloroprenes, polyisoprenes, natural rubbers, cellulose, nitrocellulose, cellulose ether, regenerated cellulose, hemicelluloses, polysaccharides, lignin, shellac, starch, asphaltenes, bitumens, polypeptides, proteins, regenerated proteins, collagen, polyisobutylenes, polysiloxanes, polyureas, polyurethanes, styrene-butadiene rubbers, EPDM, acrylonitrile-butadiene rubbers, ABS, isobutylene-isoprene rubbers, polyethers, poly(ethylene glycol)s, poly(ethylene oxide)s, poly(propylene glycol)s, poly(propylene oxide)s, poly(hexafluoropropylene oxide)s, poly[3,3-(dichloromethyl)trimethylene oxide]s, polytetrahydrofurans, poly(alkylene polysulfide)s, poly(methyl vinyl ketone)s, polyketones, polyetheretherketones, polyetherimides, polyimides, polysulfones, polycarbonates, polyamideimides, polyarylates, polybenzimidazoles, poly(phenylene oxide)s, poly(phenylene sulfide)s, poly(p-xylylene)s, polyacetals, polyformaldehydes, polyketals, polyacetones, polyvinylpyrrolidones, polyvinylpyridines, poly(vinyl chloride)s, poly(vinylidene chloride)s, poly(vinylidene fluoride)s, poly(vinyl acetate)s, poly(vinyl alcohol)s, poly[ethylene-co-(vinyl acetate)]s, poly[ethylene-co-(vinyl alcohol)]s, and combination polymer mixtures, copolymers or terpolymers thereof.

The more preferred polymer binder is selected from polyacrylates, polymethacrylates, polyacrylamides, polyacrylonitriles, polystyrenes, PMMA, PS-PMMA copolymers, poly(styrenesulfonic acid)s, poly(styrene sulfonate)s, poly(alkyl styrenesulfonate)s, polyphosphoric acids, poly (ethylene phosphate)s, poly(propylene phosphate)s, nylons, polycaprolactams, polyamides, polyvinylpyrrolidones, polyvinylpyridines, polyphosphazenes, polyesters, PET, polycaprolactones, polybutadienes, polychloroprenes, polyisoprenes, natural rubbers, polyisobutylenes, styrene-butadiene rubbers, EPDM, acrylonitrile-butadiene rubbers, ABS, isobutylene-isoprene rubbers, polyethers, poly(ethylene glycol)s, poly(ethylene oxide)s, poly(propylene glycol)s, poly (propylene oxide)s, polytetrahydrofurans, polysiloxanes, poly(methyl vinyl ketone)s, polyketones, polyetheretherketones, polyetherimides, polyimides, polyamideimides, polybenzimidazoles, polyureas, polyurethanes, polycarbonates, polyarylates, poly(p-xylylene)s, poly(phenylene oxide)s, poly(phenylene sulfide)s, polysulfones, polyacetals, polyformaldehydes, polyketals, polyacetones, poly(vinylidene fluoride)s, poly(vinyl acetate)s, poly(vinyl alcohol)s, poly [ethylene-co-(vinyl acetate)]s, poly[ethylene-co-(vinyl alcohol)]s, and the combination copolymers, terpolymers, or polymer mixtures thereof.

The concentration of the monomer in the composition may range from 1 wt % to about 99 wt %, preferably from 10 wt % to about 99 wt %. The molar ratio of the acid as the polymerization catalyst to the monomer may range from 0.0001 to 0.5, preferably from 0.001 to 0.3. The molar ratio of the polymerization retardant to the acid catalyst may range from 0.1 to 1000, preferably from 1 to 100, more preferably from 1 to 20.

<Method for Forming Electroactive Polymer Solution>

The method for forming an electroactive polymer solution of this invention includes: placing the above composition in a reactor, and conducting at least one of a step of raising the temperature of the composition, a step of evaporating partly the solvent in the composition, and a step of evaporating partly or completely the polymerization retardant used as the functional component in the composition, so as to initiate and/or continue polymerization to form an electroactive polymer solution comprising a conjugated heteroaromatic polymer.

<Method for Forming Electroactive Coating>

The method for forming an electroactive coating of this invention includes: a) contacting the above composition with a surface of a substrate, and b) conducting at least one of a step of raising the temperature of the substrate, a step of evaporating partly the solvent in the composition, and a step of evaporating partly or completely the polymerization retardant used as the functional additive in the composition, so as to induce and/or continue the polymerization on the surface of the substrate and form an electroactive coating comprising a conjugated heteroaromatic polymer.

The substrate may include a porous substrate used for fabricating a capacitor, corresponding to the above substrate 20 (FIGS. 2A to 2C) that may be a substrate of an electrode, a solar cell, a window, a panel, a screen; or a corrodible material, an electroactive object, a circuitry board, a textile, a fiber, a plastic, a paper, a nonwoven pad, a flexible glass, a ceramic, an epoxy board, a LED or an antistatic object. The porous substrate may be a porous anode electrode of a capacitor element having a desirable dielectric surface layer formed by anodization.

The raised temperature may be within the range of 30 to 200° C.

In addition, by including an effective polymerization retardant as a functional component, such as a Lewis base having a stronger basicity than the monomer, the stability of the composition for forming an electroactive coating of this invention can be greatly enhanced, which will allow the use of a composition having a much higher monomer concentration so that a conductive polymer coating having a sufficient thickness may be formed in a single cycle of the above steps a) and b). Nevertheless, if required, it is also possible to repeat the steps a) and b) for at least one cycle.

An example where the at least one functional component includes at least a polymerization retardant is described below, also being illustrated by FIGS. 2A to 2C.

Referring to FIG. 2A, a solution 22 of a compound of formula (1) or (2) with Z=H and Y≠H or a neat liquid of the compound is applied to a substrate 20. Because of the presence of the polymerization retardant, the solution 22 is allowed to use a desirable higher concentration of the compound, or even a neat liquid of the compound. The solution 22 may also or alternatively contain shorter polymer formed previously with the method of this invention. The substrate 20 may be any one mentioned above.

Referring to FIG. 2B, a polymerization reaction of this invention is initiated and/or continued (when the solution contains shorter polymer formed previously with the method of this invention) by conducting at least one of a step of raising a temperature of the substrate 20, a step of evaporating partly the solvent in the composition, and a step of evaporating partly or completely the polymerization retardant in the composition, so as to form an electroactive solution or film 24 on the substrate 20. A thin layer 26' of the conductive polymer in the form of precipitates may be deposited on the surface of the substrate 20. It is also possible that the preformed oligomer or polymer molecules can undergo continuous polymerization effectively, leading to higher molecular weight polymers and eventually resulting in an electroactive polymer coating with greater mechanical strength and higher conductivity.

Referring to FIG. 2C, the remaining solvent is then fully removed as in the above example, leaving an electroactive polymer film 26 on the substrate 20.

<Method for Fabricating Solid Electrolytic Capacitor>

The method for fabricating a solid electrolytic capacitor of this invention includes: forming an anode, forming a dielectric layer on the anode, and then forming a conjugated heteroaromatic polymer coating as a solid electrolyte on the dielectric layer with the above methods for forming a conjugated heteroaromatic polymer coating.

The anode may be formed from a valve metal composition. The valve metal composition may contain a valve metal (i.e., a metal that can be oxidized) or a valve metal-based compound, such as tantalum, niobium, aluminum, hafnium, titanium, alloys thereof, oxides thereof, nitrides thereof, and so on. Examples of the anode formed from valve metal oxides may include niobium oxide (e.g., NbO), tantalum oxide, etc.

The dielectric layer may be formed on the anode by anodizing the surface of the anode. Anodization is an electrical chemical process by which the metal of the anode is oxidized to form a material having a relatively high dielectric constant. For example, the surface of a tantalum anode may be anodized to form tantalum oxide ($Ta_2O_5$) surface layer, which has a dielectric constant "k" of about 27. For another example, the aluminum anode may be anodized to form an aluminum oxide ($Al_2O_3$) surface layer, which has a dielectric constant "k" of about 7 to 10.

To conduct anodization, the anode (e.g., Al metal foil) may be dipped into a weak acid solution at an elevated temperature that is supplied with a controlled amount of voltage and current to form a dielectric (e.g., $Al_2O_3$) surface layer having a certain thickness. The power supply may be initially kept at a constant current until the required formation voltage is reached. Thereafter, the power supply is kept at a constant voltage to ensure that the desired dielectric quality is formed over the surface of the anode (e.g., aluminum anode). The anodization voltage typically ranges from about 5 to about 700 volts.

Nevertheless, it is well known in the art that that the dielectric layer on the anode may be formed from other types of materials and using different techniques.

EXAMPLES

The following examples are intended to further explain this invention, but are not intended to limit the scope of this invention.

Examples 1-4. Effects of Functional Components of Polymerization Retardant and Polymer Binder An anode aluminum foil having an $Al_2O_3$ dielectric layer formed at an electrochemical forming voltage of 9 V and a cathode aluminum foil of high surface area prepared by an electrochemical erosion were wounded together with an interposed separator to form a solid electrolytic capacitor element, as conventionally designed for a capacitor with a rated voltage of 6.3 V and a rated capacitance of 470 μF. After the electrochemical reforming treatment in an organic acid solution to repair the damaged dielectric layer, the capacitor element was dipped for 10 minutes in a composition solution containing 2-bromo-3,4-ethylenedioxythiophene (BEDOT) as the monomer (1 M) and toluenesulfonic acid (TsOH) as the acid catalyst (0.05 equiv) together with or without the addition of optional functional component(s), such as polymerization retardant (e.g., ethyl acetate; EA; 1 equiv) and/or polymer binder (e.g., polystyrene; PS; 0.1 equiv). Then, the polymerization was performed by heating the dipped capacitor element at the elevated temperatures ranging from 60° C. to 190° C. for 30 min to drive the polymerization to completion. The static capacitance (C; at 120 Hz), the equivalent series resistance (ESR; at 100 kHz) and the dissipation factor (DF; at 120 Hz) was measured and summarized in Table 1.

Comparative Example A

A wounded aluminum capacitor, as prepared by the same method in Examples 1-4, was dipped with a monomer solution of 3,4-ethylenedioxythiophene (EDOT; 30 wt %) and then with an oxidant solution of iron(III) tosylate ($Fe(OTs)_3$; 30 wt %; 2.5 equiv) for 10 minutes, respectively. Then, the polymerization was performed by heating the dipped capacitor element at the elevated temperatures ranging from 60° C. to 190° C. for 30 min to drive the polymerization to completion. The static capacitance (C; at 120 Hz), the equivalent series resistance (ESR; at 100 kHz) and the dissipation factor (DF; at 120 Hz) was measured and summarized in Table 1.

TABLE 1

Effect of the addition of functional components

| Example | Polymerization retardant | Polymer binder | C (μF) (at 120 Hz) | ESR (mΩ) (at 100 KHz) | DF (at 120 Hz) |
|---|---|---|---|---|---|
| 1 | No | No | 533 | 10 | 0.021 |
| 2 | No | Yes | 525 | 12 | 0.050 |
| 3 | Yes | No | 570 | 12 | 0.038 |
| 4 | Yes | Yes | 607 | 6 | 0.016 |
| Comparative A | EDOT/Fe(OTs)$_3$ | | 412 | 15 | 0.058 |

C: static capacitor measured at 120 Hz;
ESR: equivalent series resistance measured at 100 kHz;
DF: dissipation factor measured at 120 Hz.

The results summarized in Table 1 clearly demonstrated that the solid capacitors prepared by the new cationic chain-growth polymerization method of this invention (Examples 1-4) all give much higher static capacitance (525-607 μF) than the solid capacitor prepared by the conventional oxidative polymerization method (Comparative Example A; 412 μF). Regarding to the experiments of Examples 1-4, the capacitor prepared from the composition containing no polymerization retardant and no polymer binder gave a relatively lower static capacitance (533 μF). Adding a polymerization retardant (as in Example 3) did help to give an effective increment on the static capacitance (570 μF); while addition of a polymer binder along (as in Example 2) did not help to increase the static capacitance (525 μF). Most interestingly, the use of both polymerization retardant and polymer binder (as in Example 4) not only gave the highest static capacitance (607 μF), but also gave the lowest ESR (6 mΩ) and DF value (0.016). The results indicated that the composition and the polymerization method of this invention can render the solid capacitors with much better performance, having much higher capacitance together with lower ESR and DF values.

Examples 5-8: Thermal Stability Test at 240° C.

The solid capacitors prepared in Examples 1-4 were subjected to a thermal heating experiment in Example 5-8, respectively, at 240° C. for 38 minutes. After cooling down to room temperatures, the properties of the resultant capacitors were measured and listed, respectively, in Example 5-8 (Table 2).

Comparative Example B

The solid capacitor prepared in Comparative Example A was subjected to the same thermal heating treatment as in Examples 5-8. The properties of the resultant capacitor were measured and listed in Table 2.

TABLE 2

Thermal stability test at 240° C. for 38 minutes

| Example | Functional component(s) used | | C (μF) (at 120 Hz) | ESR (mΩ) (at 100 KHz) | DF (at 120 Hz) | Capacitor performance quality |
|---|---|---|---|---|---|---|
| | Polymerization retardant | Polymer binder | | | | |
| 5 | No | No | 518 | 42 | 0.100 | downgraded |
| 6 | No | Yes | 480 | 22 | 0.060 | downgraded |
| 7 | Yes | No | 564 | 50 | 0.100 | downgraded |
| 8 | Yes | Yes | 607 | 6 | 0.011 | upgraded |
| Comparative B | EDOT/Fe(OTs)$_3$ | | 774 | 21 | 2.92 | failed in total |

C: static capacitor measured at 120 Hz;
ESR: equivalent series resistance measured at 100 kHz;
DF: dissipation factor measured at 120 Hz.

The results summarized in Tables 1 and 2 clearly demonstrated that the capacitor prepared by the conventional oxidative polymerization method (as in Comparative Example B) based on the conventional composition (EDOT/Fe(OTs)$_3$) had failed totally after been heated at 240° C. for 38 minutes, having a DF value (2.92) that had already much over 0.12 that is acceptable upper limit value of DF for a commercial solid capacitor. All the capacitors prepared by the newly invented cationic chain-growth polymerization method (Examples 5-8) from the composition of the invention (BEDOT plus acid catalyst) had all survived from the thermal treatment at 240° C. for 38 minutes. The results have further indicated that the performance of the capacitors in Examples 5-7 had actually already downgraded to some extents (though still appeared within the acceptable range), showing decreased capacitances together with increased ESR and DF values. Clearly, only the capacitor in Example 8 (with the addition of both polymerization retardant and polymer binder as the functional components) could completely overcome such thermal heating treatment, without suffering any degradation. Actually, the DF value of Example 8 had been unexpectedly and significantly reduced further from 0.016 to 0.011. The results herein clearly confirmed that the composition and polymerization method of this invention can render the solid capacitors with much higher thermal stability than the conventional composition and method. The results further indicated that best performance can be achieved when both polymerization retardant and polymer binder are used as the functional components of this invention.

Examples 9-11. Withstanding or Breakdown Voltage Test I

An anode aluminum foil having an Al$_2$O$_3$ dielectric layer formed at an electrochemical forming voltage of 50 V and a cathode aluminum foil of high surface area prepared by an electrochemical erosion were wounded together with an interposed separator to form a solid electrolytic capacitor element, as conventionally designed for a capacitor with a rated voltage of 35 V and a rated capacitance of 220 μF. After the electrochemical reforming treatment in an organic acid solution to repair the damaged dielectric layer, the capacitor element was dipped for 10 minutes in a composition solution containing monomer (BEDOT; 1.5 M) and various acid catalyst (as listed in Table 3; 0.15 equiv) together with the functional components of both polymerization retardant (ether, 2 equiv) and polymer binder (poly[styrene-co-(methyl methacrylate)]; PS-PMMA; 0.2 equiv). Then, the polymerization was performed by heating the dipped capacitor element at the elevated temperatures ranging from 60° C. to 190° C. for 30 min to drive the polymerization to completion. After the preparation, the resultant capacitors were all subjected to aging treatments to reduce their leakage currents to below the value of ~154 μA (i.e., ~0.02 CV). The capacitors were then subjected to withstanding or breakdown voltage test, respectively, by raising the applied voltage gradually until the breakdown of the electrolyte had occurred or until 48 V (the voltage slightly below the forming voltage of the anodic Al foil) was reached. The results of the withstanding or breakdown voltage for the respective electrolytes are summarized in Table 3.

Comparative Example C

A wounded aluminum capacitor, as prepared by the same method in Examples 8-11, was dipped with a monomer solution of 3,4-ethylenedioxythiophene (EDOT; 30 wt %) and then with an oxidant solution of iron(III) tosylate (Fe(OTs)$_3$; 30 wt %; 2.5 equiv) for 10 minutes, respectively. Then, the polymerization was performed by heating the dipped capacitor element at the elevated temperatures ranging from 60° C. to 190° C. for 30 min to drive the polymerization to completion. After the preparation, the resultant capacitor was all subjected to aging treatments to reduce its leakage current to ~154 μA. The capacitors were then subjected to the same withstanding or breakdown voltage test, as in Examples 9-11, by raising the applied voltage gradually until the breakdown of the electrolyte. The breakdown voltage is listed in Table 3.

TABLE 3

Withstanding or breakdown voltage tests

| Example | Composition used | Withstanding or breakdown voltage | Status of capacitor |
|---|---|---|---|
| 9 | BEDOT/DBSA | ~41 V | breakdown |
| 10 | BEDOT/DNNDSA | >48 V | withstanding |
| 11 | BEDOT/PSS | >48 V | withstanding |
| Comparative C | EDOT/Fe(OTs)$_3$ | <16 V | breakdown |

BEDOT: 2-bromo-3,4-ethylenedioxythiophene;
EDOT: 3,4-ethylenedioxythiophene;
DBSA: dedecylbenzenesulfonic acid;
DNNDSA: dinonylnaphthalenedisulfonic acid;
PSS: poly(styrenesulfonic acid);
Fe(OTs)$_3$: iron(III) tosylate.

The results summarized in Table 3 clearly indicated that the solid capacitor containing the conventional solid electrolyte prepared from the conventional composition of EDOT/Fe(OTs)$_3$ could only withstand at most up to 16 V; while the solid capacitor containing the solid electrolyte prepared from the composition of this invention can withstand the voltage up to ~41 V when the composition of Example 9 (BEDOT/DBSA) was used. The solid capacitors could withstand even higher voltages when the composition of Example 10 (BEDOT/DNNDSA) and Example 11 (BEDOT/PSS) were used. Both capacitors survived even after been forced at a high voltage of 48 V. The results indicated that the composition of this invention can render the solid capacitors of this invention with a much higher working voltage than the solid capacitors prepared with the conventional composition (EDOT/Fe(OTs)$_3$).

Examples 12-13: Withstanding or Breakdown Voltage Test II

An anode aluminum foil having an Al$_2$O$_3$ dielectric layer formed at an electrochemical forming voltage of 149 V and a cathode aluminum foil of high surface area prepared by an electrochemical erosion were wounded together with an interposed separator to form a solid electrolytic capacitor element, as conventionally designed for a capacitor with a rated voltage of 100 V and a rated capacitance of 22 µF. After the electrochemical reforming treatment in an organic acid solution to repair the damaged dielectric layer, the capacitor element was dipped for 10 minutes in a composition solution containing monomer (BEDOT; 1 M) and various acid catalyst (as listed in Table 4; 0.05 equiv) together with the functional components of both polymerization retardant (acetone, 2 equiv) and polymer binder (poly[styrene-co-(methyl acrylate)]; PS-PMA; 0.2 equiv). Then, the polymerization was performed by heating the dipped capacitor element at the elevated temperatures ranging from 60° C. to 190° C. for 30 min to drive the polymerization to completion. After the preparation, the resultant capacitors were all subjected to aging treatments to reduce their leakage currents to below the value of ~44 µA (i.e., ~0.02 CV). The capacitors were then subjected to withstanding or breakdown voltage test, respectively, by raising the applied voltage gradually until the breakdown of the electrolyte had occurred or until 145 V (the voltage slightly below the forming voltage of the anodic Al foil) was reached. The results of the withstanding or breakdown voltage for the respective electrolytes are summarized in Table 4.

TABLE 4

Withstanding or breakdown voltage tests

| Example | Composition used | Withstanding or breakdown voltage | Status of capacitor |
|---|---|---|---|
| 12 | BEDOT/DNNDSA | 61 V | Breakdown |
| 13 | BEDOT/PSS | 145 V | Withstanding |

BEDOT: 2-bromo-3,4-ethylenedioxythiophene;
DNNDSA: dinonylnaphthalenedisulfonic acid;
PSS: poly(styrenesulfonic acid).

The results summarized in Table 4 clearly indicated that the solid capacitor containing the solid electrolyte prepared from the composition of this invention can withstand the voltage up to ~61V when the composition of Example 12 (BEDOT/DNNDSA) was used. While a much higher withstand voltage of >145 V could be achieved when the composition of Example 13 (BEDOT/PSS) was used. The results indicated that the composition of this invention can render the solid capacitors with a very high working voltage.

Example 14: Long Term Lifetime Test at 125° C.

A solid capacitor similarly prepared as in Example 4, except that a copolymer of styrene/butadiene was used as the polymer binder, was subjected to a long term thermal heating at 125° C. continuously for about 7500 hours. The resultant capacitor was found to show quite similar properties (within the tolerable variation range for a commercial solid capacitor) as the initial capacitor, having a slightly decreased (~2.7%) static capacitance (at 120 Hz; from 528 to 514 µF), a fairly increased equivalent series resistance (at 100 kHz; from 19 to 28 mΩ) and dissipation factor (at 120 Hz; from 0.076 to 0.092). Most interestingly, the leakage current (at 6.3 V) has unexpectedly and significantly decreased from 38 to 17 µA. The results indicated that the composition of this invention can render the solid capacitors with a very long lifetime and a suitability for long-term high-temperature application such as for LED lighting bulbs.

Example 15: Ultrasonication Tests

The thermal heated solid capacitor of Example 8 was further subjected to a ultrasonication test. The solid capacitor was mounted on an epoxy board, soaked into a water bath of an ultrasonicator (Branson model 1510; 40 kHz, 80 W), and then subjected to ultrasonication continuously for 1 hour. After the ultrasonication treatment, all the performance remained unchanged, with the LC actually slightly decreased (from 76 µA down to 70 µA). For comparison, another conventional solid capacitor prepared similarly as in Comparative Example A was subjected directly, without a prior thermal roasting (to avoid complicated damage effects created by the compounded thermal and mechanical vibration factors), to the same ultrasonication test for 1 hour. The resultant capacitor was found to have a significantly reduced static capacitance (from 405 down to 375 µF) and substantially increased LC (increased from 75 to 214 µA). The results herein indicated that the solid capacitors of this invention are much more suitable than the conventional solid capacitors for high temperature and/or high mechanical stress applications, such as automobile electrical and electronic equipment and audio-video appliance.

This invention has been disclosed above in the preferred embodiments, but is not limited to those. It is known to one skilled in the art that some modifications and innovations may be made without departing from the spirit and scope of this invention. Hence, the scope of this invention should be defined by the following claims.

What is claimed is:

1. A composition for forming an electroactive coating, comprising:

at least one compound of formula (1) as a monomer,

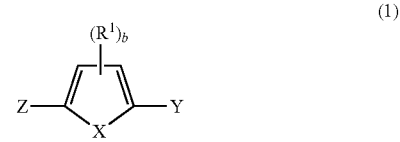

wherein
- X is selected from the group consisting of S, O, Se, Te, $PR^2$ and $NR^2$, wherein $R^2$ is selected from the group consisting of hydrogen, and substituted and unsubstituted alkyl, aryl, heteroaryl, alkanoyl, and aryloyl groups;
- Y is hydrogen (H), or a precursor of a good leaving group $Y^-$ whose conjugate acid (HY) has a $pK_a$ of less than 45;
- Z is hydrogen (H), silyl, or a precursor of a good leaving group $Z^-$ whose conjugate acid (HZ) has a $pK_a$ of less than 45;
- b is 0, 1 or 2;
- each $R^1$ is a substituent, wherein when b=2, the two $R^1$ are the same or different and may joint together to form a ring; and
- the at least one compound of formula (1) comprises at least one compound of formula (1) with Z=H and Y≠H;

an acid as a polymerization catalyst selected from the group consisting of a protic acid, a polymeric acid, and a non-transitional Lewis acid; and at least one functional component, selected from the group consisting of a solvent, a polymerization retardant, a polymer binder or a precursor of polymer binder, a dopant, a latent dopant, a dielectric layer protection agent, a dielectric layer repair agent, a plasticizer, an impact modifier, a reinforcing filler, a blowing agent, a crosslinking agent, an ultraviolet stabilizer, a flame retardant, a photoresist, a thickening agent, a defoaming agent, an emulsifier, a surfactant, and a dispersion stabilizer, wherein the at least one functional component contains at least the polymerization retardant and the polymer binder or the precursor of polymer binder, and the polymerization retardant comprises at least one Lewis base having a stronger basicity than the monomer.

2. The composition of claim 1, which comprises an O-containing polymer, a N-containing polymer, a S-containing polymer, or a P-containing polymer that serves as both the polymerization retardant and the polymer binder.

3. The composition of claim 2, wherein the O-containing polymer is selected from substituted and unsubstituted polyethers, polyacetals, polyesters, polyketones, polyetherketones, polyetheretherketones, poly(phenylene oxide)s, poly(ethylene oxide)s, poly(propylene oxide)s, poly(ethylene glycol)s, poly(propylene glycol)s, poly(vinyl acetate)s, poly[ethylene-co-(vinyl acetate)]s, polyvinyl alcohols, poly[ethylene-co-(vinyl alcohol)]s, polysiloxanes, polyacrylates and polymethacrylates;

the N-containing polymer is selected from substituted and unsubstituted polyamines, polyamides, polyimides, polyetherimides, polyureas, polyurethanes, polyphosphazenes, polyvinylpyridines, and polyvinylpyrrolidones; the S-containing polymer is selected from substituted and unsubstituted poly(phenylene sulfide)s, poly(alkylene sulfide)s, polysulfones, polythioacetals and polythioketals; the P-containing polymer is selected from substituted and unsubstituted polyphosphazenes, poly(ethylene phosphate)s and poly(propylene phosphate)s.

4. The composition of claim 1, wherein the polymer binder comprises a polymeric acid, and the polymeric acid also serves as the dopant, or as the acid as the polymerization catalyst.

5. The composition of claim 4, wherein the polymeric acid is selected from poly(glycolic acid)s, poly(lactic acid)s, polystyrenesulfonic acids, polyacrylic acids, polymethacrylic acids, polymaleic acids, polyvinylsulfonic acids, sulfonated polystyrenes, sulfonated poly(vinyl naphthalene)s, sulfonated poly(vinyl arene)s, sulfonated poly(vinyl heteroarene)s, sulfonated copolymers or terpolymers comprising at least one substituted or unsubstituted styrene repeat units, oligophosphoric acids, polyphosphoric acids, oligometaphosphoric acids, polymetaphosphoric acids, poly(ethylene phosphate)s, and poly(propylene phosphate)s, and combination mixtures, copolymers and terpolymers thereof.

6. The composition of claim 1, wherein the polymer binder comprises a thermoplastic plastic.

7. The composition of claim 6, wherein the polymer binder comprises a thermoplastic plastic that is selected from substituted and unsubstituted thermoplastic homopolymers, copolymers, terpolymers and polymer mixtures.

8. The composition of claim 1, wherein a thermosetting plastic is prepared in-situ, during polymerization of the monomer, from, as the precursor of polymer binder, a soluble monomer, oligomer, or polymer precursor plus a crosslinking or coupling reagent.

9. The composition of claim 1, wherein
- Y is selected from the group consisting of hydrogen, halogen-based, O-based, N-based, S-based, P-based, and weakly basic C-based substituent groups, and
- Z is selected from the group consisting of hydrogen, halogen-based, O-based, N-based, S-based, P-based, Si-based, and weakly basic C-based substituent groups.

10. The composition of claim 9, wherein
- Y is selected from the group consisting of hydrogen, iodide, bromide, chloride, fluoride, sulfonates, phosphates, phosphinates, phosphonates, carboxylates, carbonates, amide, imide, amino, amine, alkylamine, arylamine, heteroarylamine, acetylacetone, alkoxy, and aryloxy, and
- Z is selected from the group consisting of hydrogen, silyl, iodide, bromide, chloride, fluoride, sulfonates, phosphates, phosphinates, phosphonates, carboxylates, carbonates, amide, imide, amino, amine, alkylamine, arylamine, heteroarylamine, acetylacetone, alkoxy, and aryloxy.

11. The composition of claim 1, wherein the polymer binder is selected from polyacrylates, polymethacrylates, polyacrylamides, polyacrylonitriles, polystyrenes, PMMA, PS-PMMA copolymers, poly(styrenesulfonic acid)s, poly(styrene sulfonate)s, poly(alkyl styrenesulfonate)s, polyphosphoric acid, poly(ethylene phosphate)s, poly(propylene phosphate)s, nylons, polycaprolactams, polyamides, polyvinylpyrrolidones, polyvinylpyridines, polyphosphazenes, polyesters, PET, polycaprolactones, polybutadienes, polychloroprenes, polyisoprenes, natural rubbers, polyisobutylenes, styrene-butadiene rubbers, EPDM, acrylonitrile-butadiene rubbers, ABS, isobutylene-isoprene rubbers, polyethers, poly(ethylene glycol)s, poly(ethylene oxide)s, poly(propylene glycol)s, poly(propylene oxide)s, polytetrahydrofurans, polysiloxanes, poly(methyl vinyl ketone)s, polyketones, polyetheretherketones, polyetherimides, polyimides, polyamideimides, polybenzimidazoles, polyureas, polyurethanes, polycarbonates, polyarylates, poly(p-xylylene)s, poly(phenylene oxide)s, poly(phenylene sulfide)s, polysulfones, polyacetals, polyformaldehydes, polyketals, polyacetones, poly(vinylidene fluoride)s, poly(vinyl acetate)s, poly(vinyl alcohol)s, poly[ethylene-co-(vinyl acetate)]s, poly[ethylene-co-(vinyl alcohol)]s, and the combination copolymers, terpolymers, or polymer mixtures thereof.

12. The composition of claim 1, wherein the acid catalyst is an organic acid selected from substituted and unsubstituted aliphatic, cycloaliphatic, aromatic, or heteroaromatic compounds containing one or more acid functional groups selected from the groups consisting of sulfonic acid, sulfinic acid, sulfamic acid, sulfanilic acid, sulfuric acid, hydrogen sulfate, bisulfate, carboxylic acids, carbonic acid, phosphonic acid, phosphinic acid, phosphoric acid, hydrogen phosphate, dihydrogen phosphate, phosphonous acid, phosphonamidic acid, boric acid, and amino acid.

13. The composition of claim 12, wherein the acid catalyst is selected from substituted and unsubstituted aromatic or heteroaromatic compounds containing one or more acid functional groups selected from the groups consisting of sulfonic acid, sulfamic acid, sulfanilic acid, phosphinic acid, and phosphonic acid.

14. The composition of claim 1, wherein the acid catalyst is a polymeric acid selected from organic or inorganic oligomers or polymers being substituted with more than one acid functional groups selected from the groups consisting of sulfonic acid, sulfinic acid, sulfamic acid, sulfanilic acid, sulfuric acid, hydrogen sulfate, bisulfate, carboxylic acids, carbonic acid, phosphonic acid, phosphinic acid, phosphoric acid, hydrogen phosphate, dihydrogen phosphate, phosphonous acid, phosphonamidic acid, boric acid, and amino acid.

15. The composition of claim 1, wherein the acid catalyst is a polymeric acid selected from polystyrenesulfonic acids, polyvinylsulfonic acids, sulfonated-polystyrenes, sulfonated copolymers or terpolymers that comprise at least one substituted or unsubstituted styrene repeat units, polyphosphoric acids, poly(ethylene phosphate)s, and poly(propylene phosphate)s, and combination mixtures, copolymers and terpolymers thereof.

16. A method for forming an electroactive coating, comprising:
a) contacting the composition of claim 1 with a substrate; and
b) conducting at least one of a step of raising a temperature of the substrate, a step of evaporating partly the solvent in the composition, and a step of evaporating partly or completely the polymerization retardant in the composition, so as to initiate and/or continue polymerization on a surface of the substrate and/or in a hole of the substrate and form a conjugated heteroaromatic polymer.

17. A composition for forming an electroactive coating, comprising:

at least one compound of formula (2) as a monomer,

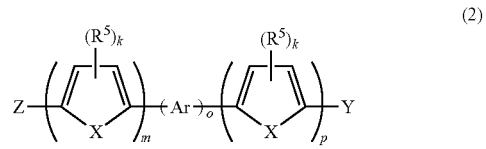

wherein
X is the same or different at each occurrence, and is independently selected from the group consisting of S, O, Se, Te, $PR^2$ and $NR^2$, wherein $R^2$ is selected from the group consisting of hydrogen, and substituted and unsubstituted alkyl, aryl, heteroaryl, alkanoyl, and aryloy groups;
Y is hydrogen (H), or a precursor of a good leaving group $Y^-$ whose conjugate acid (HY) has a $pK_a$ of less than 45;
Z is hydrogen (H), silyl, or a precursor of a good leaving group $Z^-$ whose conjugate acid (HZ) has a $pK_a$ of less than 45;
Ar is a substituted or unsubstituted, mono- or polynuclear, aryl or heteroaryl ring;
m, o and p are each independently an integer equal to or greater than 0, with a proviso that m+p≥1;
each k is independently 0, 1 or 2;
each $R^5$ is a substituent, wherein any two $R^5$ on the same ring or on two neighboring rings, or $R^5$ and a substituent group on a neighboring Ar ring, may join together to form another ring, and
wherein the at least one compound of formula (2) comprises at least one compound of formula (2) with Z=H and Y≠H;
an acid as a polymerization catalyst selected from the group consisting of a protic acid, a polymeric acid, and a non-transitional Lewis acid;
at least one functional component selected from the group consisting of a solvent, a polymerization retardant, a polymer binder or a precursor of polymer binder, a dopant, a latent dopant, a dielectric layer protection agent, a dielectric layer repair agent, a plasticizer, an impact modifier, a reinforcing filler, a blowing agent, a crosslinking agent, an ultraviolet stabilizer, a flame retardant, a photoresist, a thickening agent, a defoaming agent, an emulsifier, a surfactant, and a dispersion stabilizer,
wherein the at least one functional component contains at least the polymerization retardant and the polymer binder or the precursor of polymer binder, and the polymerization retardant comprises at least one Lewis base having a stronger basicity than the monomer.

* * * * *